(12) United States Patent
Gutfinger et al.

(10) Patent No.: US 12,490,965 B2
(45) Date of Patent: Dec. 9, 2025

(54) OCCLUDER INCLUDING EXTERNAL SKIRT

(71) Applicant: St. Jude Medical, Cardiology Division, Inc., St. Paul, MN (US)

(72) Inventors: Dan E. Gutfinger, Agoura Hills, CA (US); Michael P Meyer, Minnetrista, MN (US); Pankaj Gupta, Maple Grove, MN (US)

(73) Assignee: St. Jude Medical, Cardiology Division, Inc., St. Paul, MN (US)

( * ) Notice: Subject to any disclaimer, the term of this patent is extended or adjusted under 35 U.S.C. 154(b) by 0 days.

(21) Appl. No.: 17/004,415

(22) Filed: Aug. 27, 2020

(65) Prior Publication Data

US 2021/0059651 A1   Mar. 4, 2021

Related U.S. Application Data

(60) Provisional application No. 63/030,086, filed on May 26, 2020, provisional application No. 62/892,140, filed on Aug. 27, 2019.

(51) Int. Cl.
*A61B 17/00* (2006.01)
*A61L 31/00* (2006.01)
*A61L 31/02* (2006.01)

(52) U.S. Cl.
CPC ........ *A61B 17/0057* (2013.01); *A61L 31/005* (2013.01); *A61L 31/022* (2013.01); *A61B 2017/00606* (2013.01); *A61B 2017/00615* (2013.01); *A61B 2017/00623* (2013.01); *A61B 2017/00867* (2013.01)

(58) Field of Classification Search
CPC ...... A61B 17/0057; A61B 2017/00606; A61B 2017/00615; A61B 2017/00623; A61B 2017/00867; A61L 31/005; A61L 31/022
See application file for complete search history.

(56) References Cited

U.S. PATENT DOCUMENTS

| 5,725,552 A * | 3/1998 | Kotula ............ A61B 17/12177 |
| | | 604/509 |
| 6,123,715 A | 9/2000 | Amplatz |
| 7,582,104 B2 * | 9/2009 | Corcoran ........... A61B 17/0057 |
| | | 606/151 |

(Continued)

FOREIGN PATENT DOCUMENTS

EP    2207500 A1    7/2010

OTHER PUBLICATIONS

EP Search Report and Opinion for related EP Patent Application No. 20193071.6, mailed Aug. 27, 2021, 11 pages.

(Continued)

*Primary Examiner* — Jing Rui Ou
(74) *Attorney, Agent, or Firm* — Armstrong Teasdale LLP

(57) ABSTRACT

The present disclosure is directed to embodiments and methods of reducing or eliminating erosion resulting from the use of an occluder, as well as reducing or eliminating other interference with cardiac tissue by an occluder, including reducing pressure on cardiac tissue, minimizing microperforations, and/or minimizing residual leak by improving sealing around the occluder. In particular, the present disclosure is directed to providing an external skirt on an occluder that improves sealing of the occluder while reducing interference with the cardiac tissue by the occluder.

18 Claims, 23 Drawing Sheets

(56) References Cited

U.S. PATENT DOCUMENTS

| | | | |
|---|---|---|---|
| 2003/0171774 A1* | 9/2003 | Freudenthal | A61B 17/0057 606/213 |
| 2004/0220610 A1* | 11/2004 | Kreidler | A61L 31/129 606/151 |
| 2005/0119675 A1 | 6/2005 | Adams | |
| 2005/0228434 A1* | 10/2005 | Amplatz | A61B 17/12109 606/200 |
| 2006/0224183 A1* | 10/2006 | Freudenthal | A61B 17/12036 606/213 |
| 2006/0241690 A1* | 10/2006 | Amplatz | A61B 17/0057 606/213 |
| 2007/0265658 A1* | 11/2007 | Nelson | A61B 17/0469 606/213 |
| 2008/0033475 A1* | 2/2008 | Meng | A61B 17/12022 606/191 |
| 2008/0249562 A1* | 10/2008 | Cahill | A61B 17/0057 606/215 |
| 2010/0324538 A1* | 12/2010 | Van Orden | B29C 65/4805 604/528 |
| 2012/0029556 A1* | 2/2012 | Masters | A61B 90/39 606/213 |
| 2012/0283585 A1* | 11/2012 | Werneth | A61N 1/3756 606/200 |
| 2014/0039543 A1 | 2/2014 | Willems et al. | |
| 2014/0194981 A1* | 7/2014 | Menk | A61F 2/2418 623/2.17 |
| 2015/0142049 A1 | 5/2015 | Delgado et al. | |
| 2016/0374801 A1* | 12/2016 | Jimenez | A61F 2/2418 623/2.18 |
| 2017/0014114 A1* | 1/2017 | Rafiee | A61B 17/12145 |
| 2018/0317933 A1 | 11/2018 | Nita | |
| 2019/0175185 A1 | 6/2019 | Amplatz et al. | |
| 2019/0209180 A1* | 7/2019 | Kealey | A61B 17/0057 |

OTHER PUBLICATIONS

EP Search Report and Opinion for related EP Patent Application No. 20193090.6, mailed Aug. 26, 2021, 11 pages.

* cited by examiner

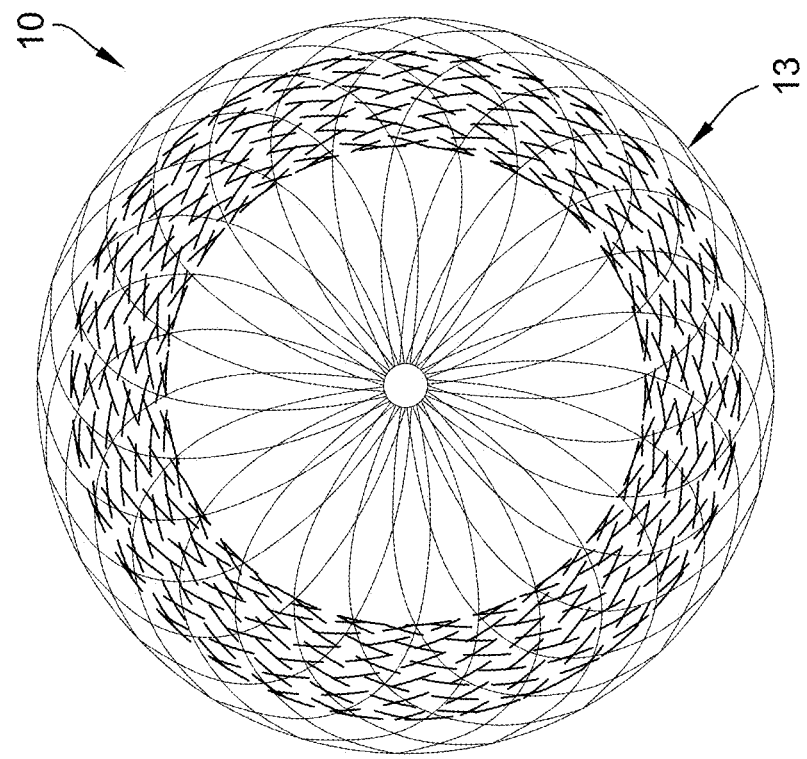
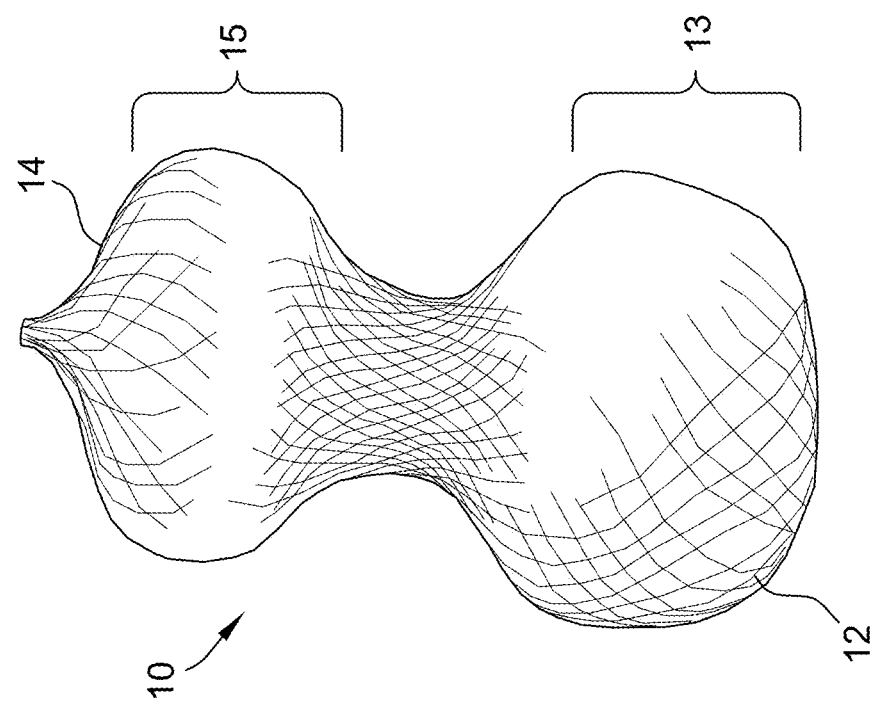
FIG. 6A
FIG. 6B

OCCLUDER INCLUDING EXTERNAL SKIRT

CROSS-REFERENCE TO RELATED APPLICATIONS

The present application claims the benefit of priority to U.S. Provisional Patent Application No. 62/892,140, filed Aug. 27, 2019, and to U.S. Provisional Patent Application No. 63/030,086, filed May 26, 2020, the entire contents and disclosures of which are hereby incorporated by reference herein.

BACKGROUND OF THE DISCLOSURE

A. Field of the Disclosure

The present disclosure relates generally to medical devices that are used in the human body. In particular, the present disclosure is directed to embodiments and methods of reducing or eliminating erosion resulting from the use of an occluder, as well as occluders including an external skirt. More specifically, the present disclosure is directed to reducing or eliminating erosion while maintaining the fundamental function and effectiveness of an occluder, as well as reducing or elimination residual leak, microperforation, and other stresses on surrounding tissue while improving a sealing effect of the occluder. The embodiments and methods disclosed herein reduce or eliminate erosion, for example, by reducing the friction or force of an occluder on cardiac tissue and/or by increasing occluder disc compliance to cardiac structures and movements.

B. Background

An occluder is a device used in trans-catheter secundum atrial septal defect closures. Secundum atrial septal defects are common congenital heart defects that allow blood to flow between the left and right atria of the heart, increasing the workload on the heart. Occluders are generally delivered through a sheath in the femoral vein and deployed in the defect to occlude blood flow.

A rare, but serious adverse event that has been reported to occur in some occluder implantations is erosion of the atrial wall tissue, which can result in formation of a pericardial effusion with cardiac tamponade and hemodynamic instability, which may result in emergency intervention. Part of the management of this tissue erosion can be draining the pericardial space, removing the device, fixing eroded holes and/or surgically closing defects. Other adverse issues with some occluder implantations include other stresses on surrounding tissue, residual leak around the occluder, and microperforations of the surrounding tissue.

Accordingly, it would be desirable to reduce or eliminate these adverse effects while maintaining the fundamental function and effectiveness of an occluder, as well as improving sealing effects of the occluder.

BRIEF SUMMARY OF THE DISCLOSURE

The present disclosure generally relates to reducing and/or eliminating erosion of cardiac tissue while maintaining the fundamental function and effectiveness of an occluder. The present disclosure discloses devices and methods to accomplish this objective, through, for example, reducing friction and force on cardiac tissue, by increasing the occluder device compliance to cardiac structures and movements, reducing or eliminating residual leak, reducing heart block, and/or reducing micro-perforation In one embodiment, the present disclosure is directed to a medical device for treating a target site. The medical device comprises a tubular member comprising a proximal disc portion at a proximal end, a distal disc portion at a distal end, and a waist member extending between the proximal disc portion and the distal disc portion, wherein the tubular member comprises at least one braided layer and has an expanded configuration when deployed at the target site and a reduced configuration for delivery to the target site. The medical device also includes a fabric coating covering at least one of the proximal disc portion and the distal disc portion.

In another embodiment, the present disclosure is directed to a method of eliminating or reducing erosion of cardiac tissue. The method comprises providing a medical device comprising a tubular member comprising a proximal disc portion at a proximal end, a distal disc portion at a distal end, and a waist member extending between the proximal disc portion and the distal disc portion, wherein the tubular member comprises at least one braided layer and has an expanded configuration when deployed at the target site and a reduced configuration for delivery to the target site. The medical device also includes a fabric coating covering at least one of the proximal disc portion and the distal disc portion. The method also includes constraining the medical device from a preset expanded configuration to a reduced configuration; delivering the medical device; deploying the medical device such that the tubular member returns to the preset expanded configuration; and, eliminating or reducing friction of the medical device on cardiac tissue.

In one embodiment, the present disclosure is directed to a medical device for treating a target site. The medical device comprises a tubular member comprising a proximal disc portion at a proximal end, a distal disc portion at a distal end, and a waist member extending between the proximal disc portion and the distal disc portion, wherein the tubular member has an expanded configuration when deployed at the target site and a reduced configuration for delivery to the target site, and wherein the tubular member comprises at least one braided layer, wherein the at least one braided layer is encapsulated with a polymer coating.

In another embodiment, the present disclosure is directed to a method of eliminating or reducing erosion of cardiac tissue. The method comprises providing a medical device comprising a tubular member comprising a proximal disc portion at a proximal end, a distal disc portion at a distal end, and a waist member extending between the proximal disc portion and the distal disc portion, wherein the tubular member has an expanded configuration when deployed at the target site and a reduced configuration for delivery to the target site, and wherein the tubular member comprises at least one braided layer, wherein the at least one braided layer is encapsulated with a polymer coating; constraining the medical device from a preset expanded configuration to a reduced configuration; delivering the medical device; deploying the medical device such that the tubular member returns to the preset expanded configuration; and eliminating or reducing friction of the medical device on cardiac tissue.

In one embodiment, the present disclosure is directed to a medical device for treating a target site. The medical device comprises a tubular member comprising a proximal disc portion at a proximal end, a distal disc portion at a distal end, and a waist member extending between the proximal disc portion and the distal disc portion, wherein the tubular member comprises at least one braided layer and has an expanded configuration when deployed at the target site and a reduced configuration for delivery to the target site, and wherein a parylene coating covers at least a portion of the at least one braided layer.

In another embodiment, the present disclosure is directed to a method of eliminating or reducing erosion of cardiac tissue. The method comprises providing a medical device comprising a tubular member comprising a proximal disc portion at a proximal end, a distal disc portion at a distal end, and a waist member extending between the proximal disc portion and the distal disc portion, wherein the tubular member comprises at least one braided layer and has an expanded configuration when deployed at the target site and a reduced configuration for delivery to the target site, and wherein a parylene coating covers at least a portion of the at least one braided layer; constraining the medical device from a preset expanded configuration to a reduced configuration; delivering the medical device; deploying the medical device such that the tubular member returns to the preset expanded configuration; and, eliminating or reducing friction of the medical device on cardiac tissue.

In one embodiment, the present disclosure is directed to a medical device for treating a target site. The medical device comprises a tubular member comprising a proximal disc portion at a proximal end, a distal disc portion at a distal end, and a waist member extending between the proximal disc portion and the distal disc portion, wherein the tubular member has an expanded configuration when deployed at the target site and a reduced configuration for delivery to the target site, and wherein the tubular member comprises at least one braided layer, wherein the at least one braided layer comprises a polymeric fabric coating located on an outside surface of the braided layer, wherein the polymeric fabric coating is deposited on the outside surface of the braided layer through an electrospinning process.

In another embodiment, the present disclosure is directed to a method of eliminating or reducing erosion of cardiac tissue. The method comprises providing a medical device comprising a tubular member comprising a proximal disc portion at a proximal end, a distal disc portion at a distal end, and a waist member extending between the proximal disc portion and the distal disc portion, wherein the tubular member has an expanded configuration when deployed at the target site and a reduced configuration for delivery to the target site, and wherein the tubular member comprises at least one braided layer, wherein the at least one braided layer comprises a polymeric fabric coating located on an outside surface of the braided layer, wherein the polymeric fabric coating is deposited on the outside surface of the braided layer through an electrospinning process; constraining the medical device from a preset expanded configuration to a reduced configuration; delivering the medical device; deploying the medical device such that the tubular member returns to the preset expanded configuration; and, eliminating or reducing friction of the medical device on cardiac tissue.

In one embodiment, the present disclosure is directed to a medical device for treating a target site. The medical device comprises a tubular member comprising a proximal disc portion at a proximal end, a distal disc portion at a distal end, and a waist member extending between the proximal disc portion and the distal disc portion, wherein the tubular member comprises at least one braided layer and has an expanded configuration when deployed at the target site and a reduced configuration for delivery to the target site, wherein the at least one braided layer comprises a ceramic coating on an outside surface of the braided layer.

In another embodiment, the present disclosure is directed to a method of eliminating or reducing erosion of cardiac tissue. The method comprises providing a medical device comprising a tubular member comprising a proximal disc portion at a proximal end, a distal disc portion at a distal end, and a waist member extending between the proximal disc portion and the distal disc portion, wherein the tubular member comprises at least one braided layer and has an expanded configuration when deployed at the target site and a reduced configuration for delivery to the target site, wherein the at least one braided layer comprises a ceramic coating on an outside surface of the braided layer; constraining the medical device from a preset expanded configuration to a reduced configuration; delivering the medical device; deploying the medical device such that the tubular member returns to the preset expanded configuration; and, eliminating or reducing friction of the medical device on cardiac tissue.

In one embodiment, the present disclosure is directed to a medical device for treating a target site. The medical device comprises a tubular member comprising a proximal disc portion at a proximal end, a distal disc portion at a distal end, and a waist member extending between the proximal disc portion and the distal disc portion, wherein the tubular member has an expanded configuration when deployed at the target site and a reduced configuration for delivery to the target site, and wherein the tubular member comprises at least one braided layer, wherein the at least one braided layer comprises a wire braid design between a 72 wire braid design and a 288 wire braid design, including all wire braid designs therebetween.

In another embodiment, the present disclosure is directed to a method of eliminating or reducing erosion of cardiac tissue. The method comprises providing a medical device comprising a tubular member comprising a proximal disc portion at a proximal end, a distal disc portion at a distal end, and a waist member extending between the proximal disc portion and the distal disc portion, wherein the tubular member has an expanded configuration when deployed at the target site and a reduced configuration for delivery to the target site, and wherein the tubular member comprises at least one braided layer, wherein the at least one braided layer comprises a wire braid design between a 72 wire braid design and a 288 wire braid design, including all wire braid designs therebetween; constraining the medical device from a preset expanded configuration to a reduced configuration; delivering the medical device; deploying the medical device such that the tubular member returns to the preset expanded configuration; and, increasing the medical device compliance on cardiac tissue.

In one embodiment, the present disclosure is directed to a medical device for treating a target site. The medical device comprises a tubular member comprising a proximal disc portion at a proximal end, a distal disc portion at a distal end, and a waist member extending between the proximal disc portion and the distal disc portion, wherein the tubular member has an expanded configuration when deployed at the target site and a reduced configuration for delivery to the target site, and wherein the tubular member comprises multiple braided layers, wherein each braided layer comprises a unique layer geometry relative to the other braided layers of the multiple braided layers.

In another embodiment, the present disclosure is directed to a method of eliminating or reducing erosion of cardiac tissue. The method comprises providing a medical device comprising a tubular member comprising a proximal disc portion at a proximal end, a distal disc portion at a distal end, and a waist member extending between the proximal disc portion and the distal disc portion, wherein the tubular member has an expanded configuration when deployed at the target site and a reduced configuration for delivery to the target site, and wherein the tubular member comprises multiple braided layers, wherein each braided layer comprises a unique layer geometry relative to the other braided layers of the multiple braided layers; constraining the medical device from a preset expanded configuration to a reduced configuration; delivering the medical device; deploying the medical device such that the tubular member returns to the preset expanded configuration; and, increasing the medical device compliance on cardiac tissue.

In one embodiment, the present disclosure is directed to a medical device for treating a target site. The medical device comprises a tubular member comprising a proximal disc portion at a proximal end, a distal disc portion at a distal end, and a waist member extending between the proximal disc portion and the distal disc portion, wherein the tubular member has an expanded configuration when deployed at the target site and a reduced configuration for delivery to the target site, and wherein the tubular member comprises at least one braided layer with material removed from a portion thereof, wherein the portion of the braided layer with material removed comprises a smaller braid wire diameter at the proximal disc portion and the distal disc portion than at the waist member.

In another embodiment, the present disclosure is directed to a method of eliminating or reducing erosion of cardiac tissue. The method comprises providing a medical device comprising a tubular member comprising a proximal disc portion at a proximal end, a distal disc portion at a distal end, and a waist member extending between the proximal disc portion and the distal disc portion, wherein the tubular member has an expanded configuration when deployed at the target site and a reduced configuration for delivery to the target site, and wherein the tubular member comprises at least one braided layer with material removed from a portion thereof, wherein the portion of the braided layer with material removed comprises a smaller braid wire diameter at the proximal disc portion and the distal disc portion than at the waist member; constraining the medical device from a preset expanded configuration to a reduced configuration; delivering the medical device; deploying the medical device such that the tubular member returns to the preset expanded configuration; and, increasing the medical device compliance on cardiac tissue.

In one embodiment, the present disclosure is directed to a medical device for treating a target site. The medical device comprises a tubular member comprising a proximal disc portion at a proximal end, a distal disc portion at a distal end, and a waist member extending between the proximal disc portion and the distal disc portion, wherein the tubular member comprises at least one braided layer and has an expanded configuration when deployed at the target site and a reduced configuration for delivery to the target site, wherein the tubular member further comprises a proximal transition segment and a distal transition segment, wherein the proximal transition segment connects the proximal disc portion to the waist member and the distal transition segment connects the distal disc portion to the waist member, and further wherein each of the proximal transition segment and the distal transition segment has a smaller diameter than the waist member.

In another embodiment, the present disclosure is directed to a method of eliminating or reducing erosion of cardiac tissue. The method comprises providing a medical device comprising a tubular member comprising a proximal disc portion at a proximal end, a distal disc portion at a distal end, and a waist member extending between the proximal disc portion and the distal disc portion, wherein the tubular member comprises at least one braided layer and has an expanded configuration when deployed at the target site and a reduced configuration for delivery to the target site, wherein the tubular member further comprises a proximal transition segment and a distal transition segment, wherein the proximal transition segment connects the proximal disc portion to the waist member and the distal transition segment connects the distal disc portion to the waist member, and further wherein each of the proximal transition segment and the distal transition segment has a smaller diameter than the waist member; constraining the medical device from a preset expanded configuration to a reduced configuration; delivering the medical device; deploying the medical device such that the tubular member returns to the preset expanded configuration; and, increasing the medical device compliance on cardiac tissue.

In one embodiment, the present disclosure is directed to a medical device for treating a target site. The medical device comprises a tubular member comprising a proximal disc portion at a proximal end, a distal disc portion at a distal end, and a waist member extending between the proximal disc portion and the distal disc portion, wherein the proximal disc portion and the distal disc portion comprise an edge geometry selected from the group consisting of a tapered shape, a cup shape, and a round shape, and further wherein the tubular member comprises at least one braided layer and has an expanded configuration when deployed at the target site and a reduced configuration for delivery to the target site.

In another embodiment, the present disclosure is directed to a method of eliminating or reducing erosion of cardiac tissue. The method comprises providing a medical device comprising a tubular member comprising a proximal disc portion at a proximal end, a distal disc portion at a distal end, and a waist member extending between the proximal disc portion and the distal disc portion, wherein the proximal disc portion and the distal disc portion comprise an edge geometry selected from the group consisting of a tapered shape, a cup shape, and a round shape, and further wherein the tubular member comprises at least one braided layer and has an expanded configuration when deployed at the target site and a reduced configuration for delivery to the target site; constraining the medical device from a preset expanded configuration to a reduced configuration; delivering the medical device; deploying the medical device such that the tubular member returns to the preset expanded configuration; and, increasing the medical device compliance on cardiac tissue.

In one embodiment, the present disclosure is directed to a medical device for treating a target site. The medical device comprises a tubular member comprising a proximal disc portion at a proximal end, a distal disc portion at a distal end, and a waist member extending between the proximal disc portion and the distal disc portion, wherein the tubular member comprises at least one braided layer comprises a non-circular braid design, and wherein the tubular member has an expanded configuration when deployed at the target site and a reduced configuration for delivery to the target site.

In another embodiment, the present disclosure is directed to a method of eliminating or reducing erosion of cardiac tissue. The method comprises providing a medical device comprising a tubular member comprising a proximal disc portion at a proximal end, a distal disc portion at a distal end, and a waist member extending between the proximal disc portion and the distal disc portion, wherein the tubular member comprises at least one braided layer comprises a non-circular braid design, and wherein the tubular member has an expanded configuration when deployed at the target site and a reduced configuration for delivery to the target site; constraining the medical device from a preset expanded configuration to a reduced configuration; delivering the medical device; deploying the medical device such that the tubular member returns to the preset expanded configuration; and, increasing the medical device compliance on cardiac tissue.

In one embodiment, the present disclosure is directed to a medical device for treating a target site. The medical device comprises a tubular member comprising a proximal disc portion at a proximal end, a distal disc portion at a distal end, and a waist member extending between the proximal disc portion and the distal disc portion, wherein the tubular member has an expanded configuration when deployed at the target site and a reduced configuration for delivery to the target site, and wherein the tubular member comprises at least one braided layer, wherein the braided layer comprises multiple wire sizes.

In another embodiment, the present disclosure is directed to a method of eliminating or reducing erosion of cardiac tissue. The method comprises providing a medical device comprising a tubular member comprising a proximal disc portion at a proximal end, a distal disc portion at a distal end, and a waist member extending between the proximal disc portion and the distal disc portion, wherein the tubular member has an expanded configuration when deployed at the target site and a reduced configuration for delivery to the target site, and wherein the tubular member comprises at least one braided layer, wherein the braided layer comprises multiple wire sizes; constraining the medical device from a preset expanded configuration to a reduced configuration; delivering the medical device; deploying the medical device such that the tubular member returns to the preset expanded configuration; and, increasing the medical device compliance on cardiac tissue.

In one embodiment, the present disclosure is directed to a medical device for treating a target site. The medical device comprises a tubular member comprising a proximal disc portion at a proximal end and a distal disc portion at a distal end and a waist member extending between the proximal disc portion and the distal disc portion, wherein the tubular member comprises at least one braided layer and has an expanded configuration when deployed at the target site and a reduced configuration for delivery to the target site, and a skirt coupled to an external surface of at least one of the waist member, the proximal disc portion, or the distal disc portion.

In another embodiment, the present disclosure is directed to a method comprising providing a medical device comprising a tubular member comprising a proximal disc portion at a proximal end and a distal disc portion at a distal end and a waist member extending between the proximal disc portion and the distal disc portion, wherein the tubular member comprises at least one braided layer and has an expanded configuration when deployed at the target site and a reduced configuration for delivery to the target site, and a skirt coupled to an external surface of at least one of the waist member, the proximal disc portion, or the distal disc portion; and, at least one braided layer; constraining the medical device from a preset expanded configuration to a reduced configuration; delivering the medical device; deploying the medical device such that the tubular member returns to the preset expanded configuration; and, increasing the medical device compliance on cardiac tissue.

In a further embodiment, the present disclosure is directed to a medical device for treating a target site. The medical device comprises a tubular member comprising a disc portion at a first end, a lobe at a second end, and a waist member extending between the disc portion and the lobe, wherein the tubular member comprises at least one braided layer and has an expanded configuration when deployed at the target site and a reduced configuration for delivery to the target site, and a skirt coupled to an external surface of at least one of the waist member, the disc portion, or the lobe.

The foregoing and other aspects, features, details, utilities and advantages of the present disclosure will be apparent from reading the following description and claims, and from reviewing the accompanying drawings.

BRIEF DESCRIPTION OF THE DRAWINGS

FIGS. 6A and 6B depict an exemplary embodiment of an occluder configuration having a varying braid wire thickness in accordance with the present disclosure.

Corresponding reference characters indicate corresponding parts throughout the several views of the drawings. It is understood that that Figures are not necessarily to scale.

DETAILED DESCRIPTION OF THE DISCLOSURE

Figure 1:
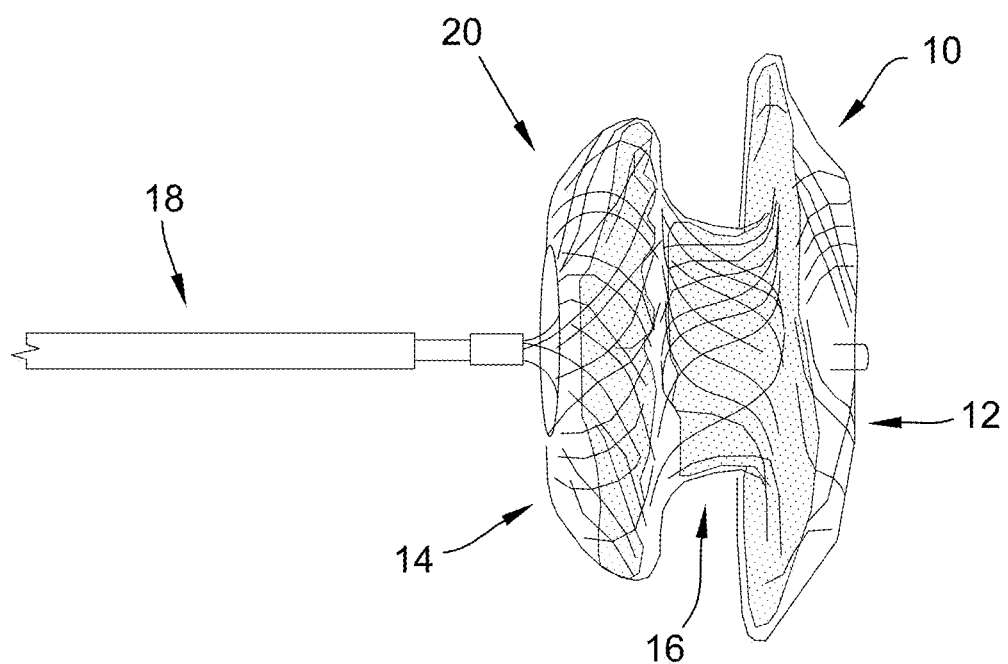
FIG. 1 is an exemplary embodiment of a medical device in accordance with the present disclosure.

The present disclosure relates generally to medical devices that are used in the human body. In particular, the present disclosure generally relates to reducing and/or eliminating erosion of cardiac tissue while maintaining the fundamental function and effectiveness of an occluder. The present disclosure discloses devices and methods to accomplish this objective, through, for example, reducing friction and force on cardiac tissue, by increasing the occluder device compliance to cardiac structures and movements, reducing or eliminating residual leak, reducing heart block, and/or reducing micro-perforation.

The disclosed embodiments may lead to more consistent and improved patient outcomes. It is contemplated, however, that the described features and methods of the present disclosure as described herein may be incorporated into any number of systems as would be appreciated by one of ordinary skill in the art based on the disclosure herein.

The present disclosure now will be described more fully hereinafter with reference to the accompanying drawings, in which some, but not all embodiments of the disclosure are shown. Indeed, this disclosure may be embodied in many different forms and should not be construed as limited to the embodiments set forth herein; rather, these embodiments are provided so that this disclosure will satisfy applicable legal requirements. Like numbers refer to like elements throughout.

Some embodiments of the present disclosure provide a medical device, such as an occlusion device (occluder), for use in occluding an abnormality in a patient's body, such as an Atrial Septal Defect (ASD), a Ventricular Septal Defect (VSD), a Patent Ductus Arteriosus (PDA), a Patent Foramen Ovale (PFO), a Left Atrial Appendage (LAA), conditions that result from previous medical procedures such as Para-Valvular Leaks (PVL) following surgical valve repair or replacement, and the like. The device may also be used as a flow restrictor or an aneurysm bridge or other type of occluder for placement in the vascular system. It is understood that the use of the term "abnormality" is not meant to be limiting, as the device may be configured to occlude any vessel, organ, opening, chamber, channel, hole, cavity, or the like, located anywhere in the body.

Some embodiments of the present disclosure provide an improved percutaneous catheter directed intravascular occlusion device for use in the vasculature in patients' bodies, such as blood vessels, channels, lumens, a hole through tissue, cavities, and the like, such as a PDA. Other physiologic conditions in the body occur where it is also desirous to occlude a vessel or other passageway to prevent blood flow into or therethrough. These device embodiments may be used anywhere in the vasculature where the anatomical conditions are appropriate for the design.

The medical device may include one or more layers of occlusive material, wherein each layer may be comprised of any material that is configured to substantially preclude or occlude the flow of blood so as to facilitate thrombosis. As used herein, "substantially preclude or occlude flow" shall mean, functionally, that blood flow may occur for a short time, but that the body's clotting mechanism or protein or other body deposits on the occlusive material results in occlusion or flow stoppage after this initial time period. For instance, occlusion may be clinically represented by injecting a contrast media into the upstream lumen of the device and if little or no contrast media flows through the device wall after a predetermined period of time, then the position and occlusion of the device is adequate as would be recognized by one of ordinary skill in the art. More specifically, the time for occlusion could begin after deployment of the medical device, such as after the device has expanded and engaged the lumen and the delivery device has been disconnected, until no contrast media (as observed with fluoroscopy) flows through the device. For instance, if the medical device is implanted within a lumen and contrast media is injected on one side of the device (e.g., a high pressure side) but no contrast media is observed on the opposite side of the device (e.g. a low pressure side), then the device has substantially precluded or occluded blood flow through the device. Thus, if the medical device is implanted within a PDA and contrast media is injected into the aorta and does not flow through the device to the pulmonary artery or remains stagnant within the device, then flow through the PDA is substantially precluded or occluded. According to one embodiment of the present disclosure, the device is configured to occlude at least a portion of a vessel, a channel, a lumen, an opening, or a cavity in less than about 10 minutes and even less than about 5 minutes with observed occlusions in testing as low as within about 1 minute. Thus, in one embodiment, there is not "immediate occlusion," as the device does not immediately obstruct all blood flow but, rather, the device slows the flow of blood in order for occlusion to occur as described above. Such immediate occlusion may result in problems in fixation or positioning of the device in the lumen or may result in suction or the complete stoppage of flow which may be undesirable in some circumstances.

Reduction and/or Elimination of Friction and Force on Cardiac Tissue

In some embodiments of the present disclosure, the medical devices disclosed herein reduce and/or eliminate erosion of cardiac tissue while maintaining the fundamental function and effectiveness of an occluder (such as, for example, an Amplatzer™ Septal Occluder (ASO)). The medical devices achieve this objective by reducing friction and/or force of the device on cardiac tissue.

By decreasing the device friction and/or force on cardiac tissue, the device is less likely to produce significant wear, which results in erosion of the tissue. Through, for example, reduction of the coefficient of friction of the embodiments disclosed herein, the frictional interaction between the medical device and tissue will decrease and thus the likelihood of erosion is also reduced and/or eliminated.

FIG. 1, by way of example, is an exemplary embodiment of a medical device 10 in accordance with the present disclosure. The device 10 (here, shown as an occluder) includes a left atrial disc 12 and a right atrial disc 14 connected by a waist member 16. A delivery cable 18 is connected to the device 10. The device 10 includes a braided layer 20.

a. Fabric Coating

In some embodiments of the present disclosure, the medical device comprises a tubular member comprising a proximal disc portion at a proximal end, a distal disc portion at a distal end, and a waist member extending between the proximal disc portion and the distal disc portion, wherein the tubular member comprises at least one braided layer and has an expanded configuration when deployed at the target site and a reduced configuration for delivery to the target site. The medical device also includes a fabric coating covering at least one of the proximal disc portion and the distal disc portion. In some embodiments, the friction of the medical device on the cardiac tissue is eliminated or reduced by decreasing a surface roughness of the medical device.

By affixing fabric to the device (multiple configurations are possible: such as fully encapsulating an outer or inner surface of the device, fully encapsulating an outer or inner surface of at least one disc, or partially encapsulating at least one disc (e.g., around the disc edges or flat disc sections, see FIGS. 2A-D) of the device, the surface roughness of the exposed braid is significantly decreased by more evenly applying pressure to the cardiac tissue and lowering the coefficient of friction (depending on material),In some embodiments, the fabric is affixed through sewing, adhering, laminating, electrospinning (see below) or another method. With fabric wrapped around the disc edges, the ridges/roughness formed by large openings in the braid are significantly smoothed, decreasing the abrasiveness of the medical device. Depending on the material chosen (polyester, PFTE, ePTFE, etc.), the fabric's interaction with tissue can be adjusted to best accommodate the device needs for permeability and tissue ingrowth.

In some embodiments, the fabric coating is affixed to at least one of the surface of the proximal disc portion and the surface of the distal disc portion. In some embodiments, the fabric fully encapsulates at least one of the proximal disc portion and the distal disc portion. In some embodiments, the fabric partially encapsulates at least one of the proximal disc portion and the distal disc portion.

Figure 2A:
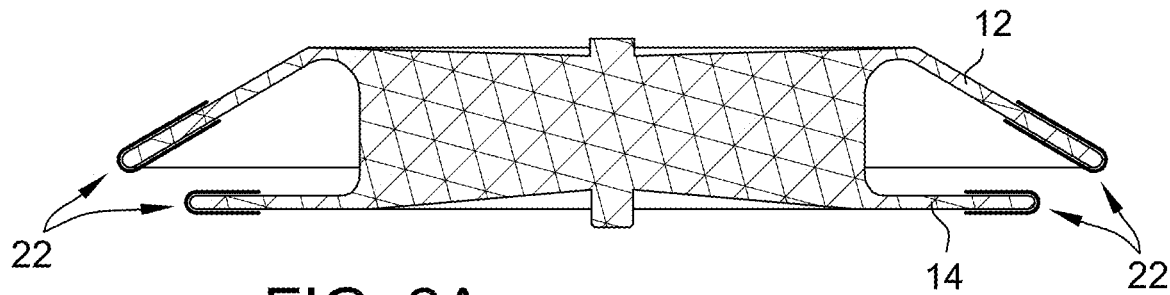
FIG. 2A is an exemplary embodiment of an occluder with a fabric coating on the disc edges in accordance with the present disclosure.

In some embodiments, the fabric coating 22 is affixed to the disc edges of discs 12 and/or 14. As shown in FIG. 2A, the fabric 22 is attached only to the edge of the discs 12, 14, which provides a buffer layer between tissue and the braid.

Figure 2B:
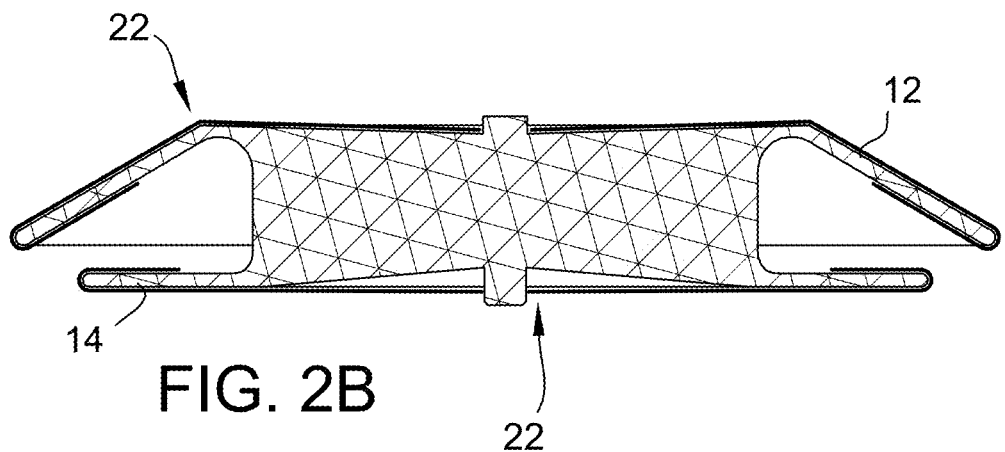
FIG. 2B is an exemplary embodiment of an occluder with a fabric coating completely covering the discs in accordance with the present disclosure.

In some embodiments, the fabric coating 22 completely covers the discs 12 and/or 14, wherein the fabric 22 encompasses each disc 12, 14 completely and wraps around the edges (see, e.g., FIG. 2B). This arrangement allows the removal of the inner fabric and provides a buffer layer between the tissue and the braid.

Figure 2C:
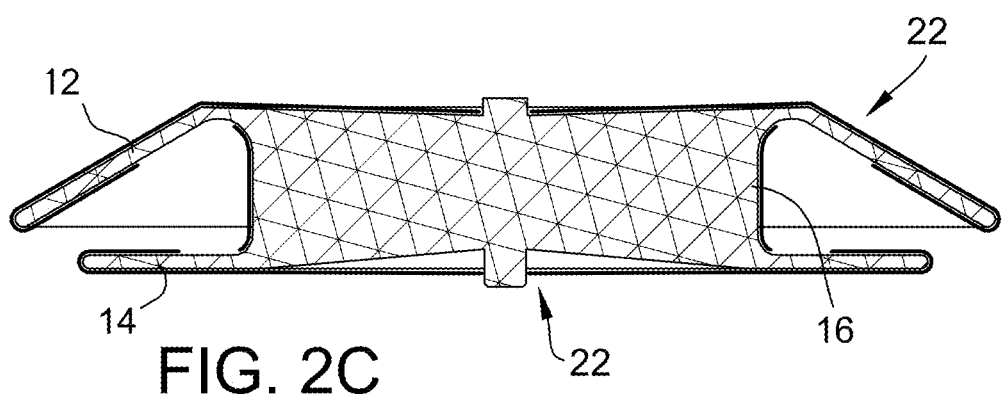
FIG. 2C is an exemplary embodiment of an occluder with a fabric coating covering both the discs and the waist in accordance with the present disclosure.

In some embodiments, the fabric coating 22 is on both the discs 12, 14 and the waist member 16, but is separated, as shown in FIG. 2C. This further cushions the tissue/braid interaction. Further, as the pieces are separated, this arrangement minimizes the need for the fabric to stretch with the braid as it elongates.

Figure 2D:
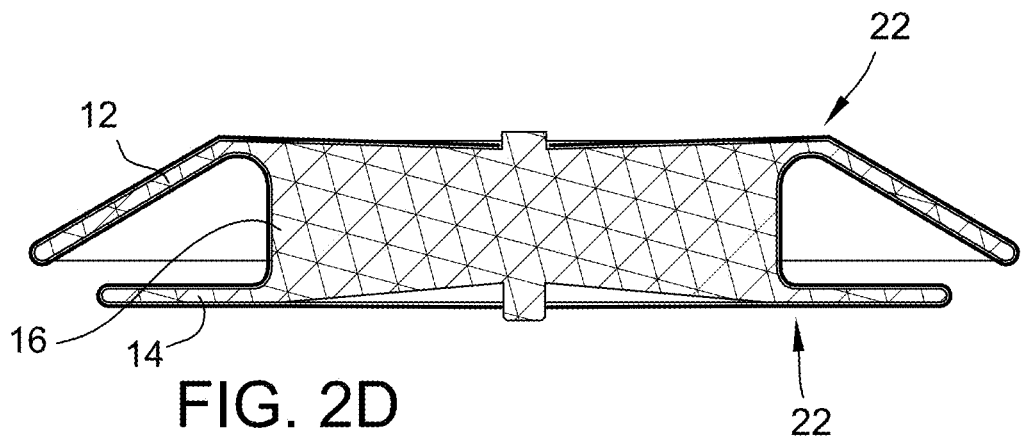
FIG. 2D is an exemplary embodiment of an occluder with a fabric coating covering the entire occluder in accordance with the present disclosure.

In some embodiments, the fabric coating 22 covers the entire occluder (see, e.g., FIG. 2D). In some embodiments, the fabric is all one piece (similar to a sock covering the entire occluder).

It is understood that the pictures shown in FIGS. 2A, 2B, 2C and 2D are exemplary cross-sections of the occluder shape, and in some embodiments, the fabric 22 wraps all the way around the diameter of the occluder.

In some embodiments, the fabric coating comprises at least one of polyester (knit, woven or non-woven), electrospun thermoplastic polyurethane (TPU), polytetrafluoroethylene (PTFE) and expanded polytetrafluoroethylene.

In some embodiments, the fabric is attached via sewing (to the braid itself), adhered (with TPU or other similar material), laminated (melted directly to the braid) or electrospun onto the braid.

b. Braid Encapsulation Coating

In some embodiments of the present disclosure, the medical device comprises a tubular member comprising a proximal disc portion at a proximal end, a distal disc portion at a distal end, and a waist member extending between the proximal disc portion and the distal disc portion, wherein the tubular member has an expanded configuration when deployed at the target site and a reduced configuration for delivery to the target site, and wherein the tubular member comprises at least one braided layer, wherein the at least one braided layer is encapsulated with a polymer coating. In some embodiments, the friction of the medical device on the cardiac tissue is eliminated or reduced by decreasing a surface roughness of the medical device.

By coating the braid through dipping in a liquid polymer, then curing it, the medical device reduces or eliminates the need for fabric while benefiting from the same result in reduction of friction by more evenly applying pressure to the cardiac tissue and lowering the coefficient of friction (depending on material). In particular, by coating the braid with a liquid polymer, whether internally, externally or a hybrid of both, the medical device reduces or eliminates the need for fabric while benefiting from the same result in reduction of friction by more evenly applying pressure to the cardiac tissue and lowering the coefficient of friction (depending on material). In some embodiments, coating is done via dipping, spray-coating, electrospinning (see below) or another method. The benefits of braid encapsulation include the removal of a need for inner fabric or sutures and a reduction in the coefficient of friction and abrasiveness near the edges due to a covering of the braid wires with a material that fully encloses the medical device.

In some embodiments, the at least one braided layer comprises an internal coating, an external coating, or both. In some embodiments, the at least one braided layer is coated through at least one of dipping, spray-coating and electrospinning. In some embodiments, the polymer coating fully encapsulates the at least one braided layer. In some embodiments, the polymer coating partially encapsulates the at least one braided layer.

Figure 3A:
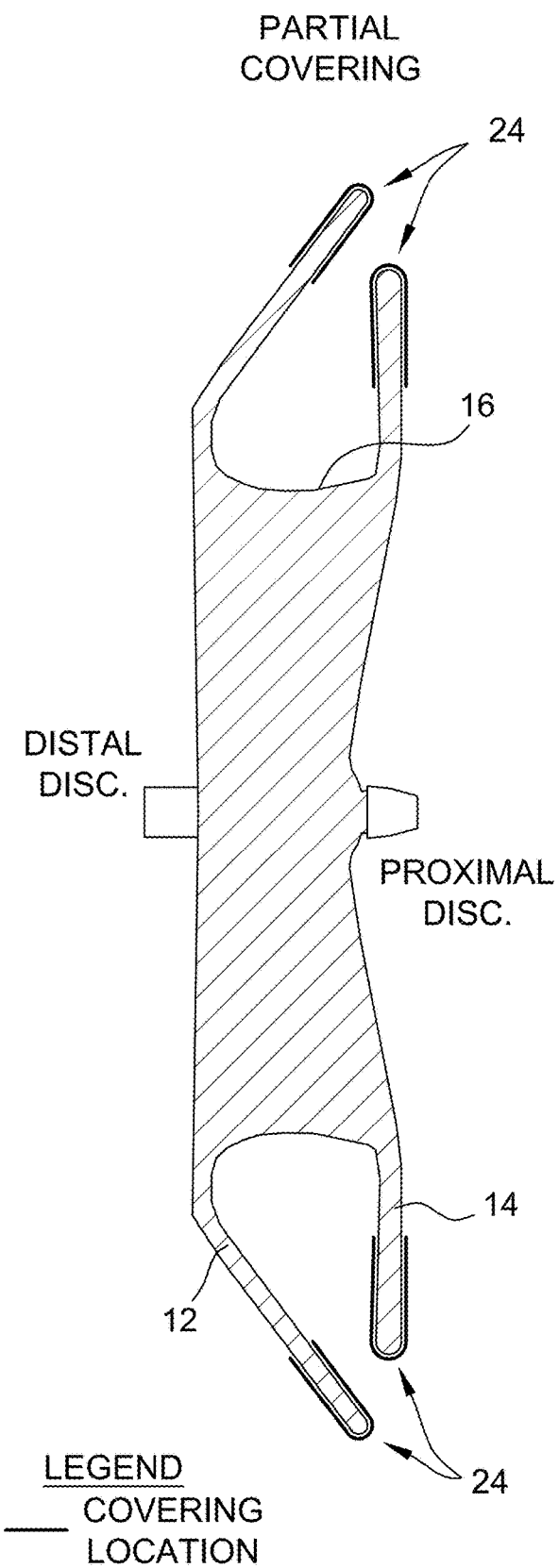
FIGS. 3A and 3B depict exemplary embodiments of braid encapsulation coatings in accordance with the present disclosure.
Figure 3B:
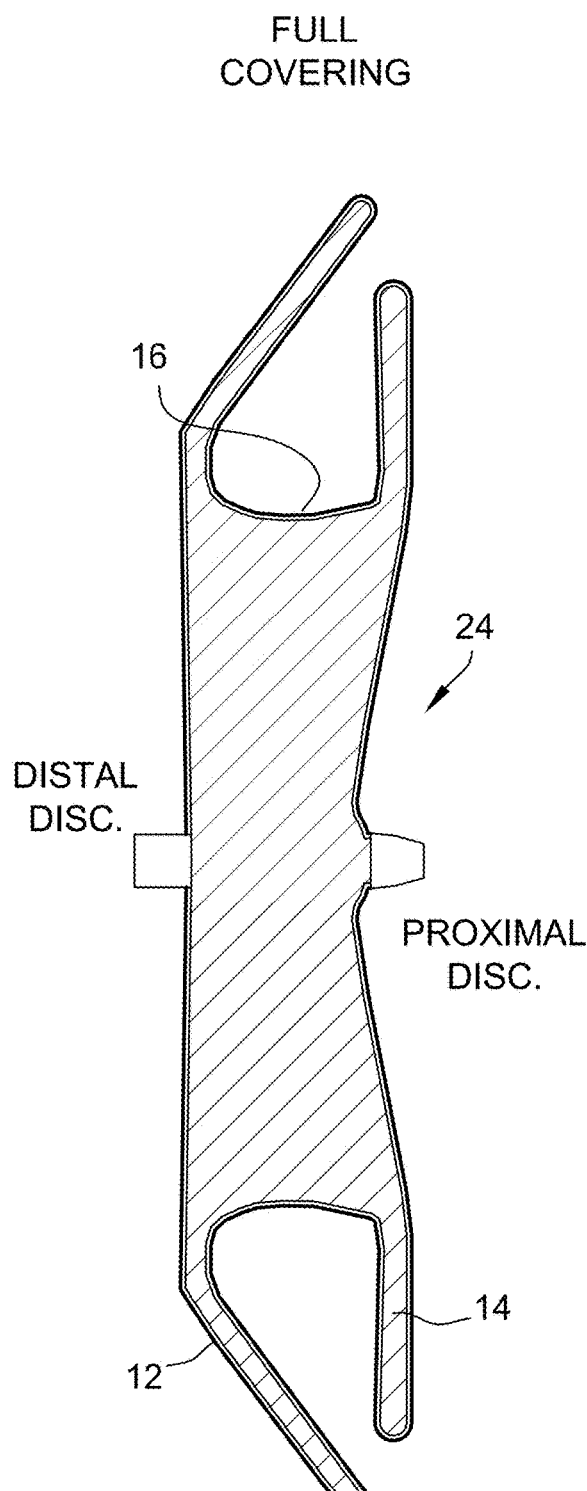

In some embodiments, specific braid encapsulation coatings are urethane or silicone-based, via a dip or spray application. In some embodiments, to promote ingrowth, the coatings are perforated with small holes via a laser. In some embodiments, the coatings are applied over the entire device, or on the edge of the disc (e.g., left atrial disc 12 and/or right atrial disc 14) only to act as a protective barrier or bumper. FIGS. 3A (partial covering) and 3B (full covering) show where the covering 24 is applied, although the covering 24 could be applied to more or less of the device than shown in the exemplary embodiment.

In some embodiments, the polymer coating comprises at least one of polyurethane or silicone. In some embodiments, the preferred coating comprises polyurethane.

In some embodiments, the braided layer comprises a material selected from the group consisting of stainless steel, nickel-based, cobalt-based, nickel-titanium, shape memory and super-elastic materials. One class of materials which meets these qualifications is the class of shape memory alloys. One particularly preferred shape memory alloy for use in the present disclosure is Nitinol. NiTi alloys are also very elastic—they are said to be "superelastic" or "pseudoelastic". This elasticity may allow the device to return to a preset expanded configuration for deployment following passage in a distorted form through a delivery catheter. In some embodiments, the braided layer comprises at least one of nylon, polypropylene, polyvinyl alcohol (PVA), polyester, and combinations thereof.

It is also understood that the device may comprise various materials other than Nitinol that have elastic properties, such as spring stainless steel, trade named alloys such as Elgiloy®, or Hastalloy, Phynox®, MP35N, CoCrMo alloys or a mixture of metal and polymer fibers. Polymer fibers may include monofilaments or multifilament yarns ranging from about 10-400 denier. Individual filaments may range from about 0.25 to 10 denier. Polymers may be composed of PET (Dacron™), polyester, polypropylene, polyethylene, HDPE, polyurethane, silicone, PTFE, polyolefins and ePTFE. The metal and plastic fibers may be combined in the same layer, or the tubular layers may be constructed in such a manner that each layer is made from a different material. The polymer layer may be a multifilament braided layer or may be composed of at least one filament or yarn wound about a mandrel with a pitch and diameter similar to other adjacent layers and may be positioned about or inside another adjacent layer or between adjacent layers. Depending on the individual material selected, the wire strand diameter, number of wire strands and pitch may be altered to achieve the desired properties of the device. Moreover, other suitable materials include those that are compatible with magnetic resonance imaging (MRI), as some materials may cause heat or torque resulting from performing MRI, and some materials may distort the MRI image. Thus, metallic and/or non-metallic materials that reduce or eliminate these potential problems resulting from using MRI may be employed.

c. Braid Parylene Coating

In some embodiments of the present disclosure, the medical device comprises a tubular member comprising a proximal disc portion at a proximal end, a distal disc portion at a distal end, and a waist member extending between the proximal disc portion and the distal disc portion, wherein the tubular member comprises at least one braided layer and has an expanded configuration when deployed at the target site and a reduced configuration for delivery to the target site, and wherein a parylene coating covers at least a portion of the at least one braided layer. In some embodiments, the friction of the medical device on the cardiac tissue is eliminated or reduced by decreasing a surface roughness of the medical device.

In some embodiments, a thin layer of parylene deposited on the formed medical device reduces the coefficient of friction of the braid (or fabric) that contacts cardiac tissue. In particular, in some embodiments the parylene coating deposition results in an extremely thin layer of lubricious polymer on all of the exposed surfaces of the medical device. This improves the ease of the device's travel down the delivery sheath, may result in the resolution of the cobra formation, and decreases the coefficient of friction of the wires. It is also understood that in some embodiments the parylene braid coating is paired with other solutions to lower the coefficient of friction in other scenarios without contributing to device profile.

In some embodiments, an exposed portion of the proximal disc portion and an exposed portion of the distal disc portion comprise a parylene coating. In some embodiments, the at least one braided layer is coated through at least one of dipping, spray-coating and electrospinning. In some embodiments, the parylene coating fully encapsulates the at least one braided layer.

In some embodiments, the process of parylene coating is a standard process known in the industry. The materials to be coated (the assembled occluder, before fabric attachment) are loaded into a coating chamber where the parylene polymer is atomized and deposited on the surface. In some embodiments, the coating thickness is very thin, often ranging from about 0.1 to about 50 microns. If needed, parts of the occluder that shouldn't be coated are masked (such as the endscrew).

A parylene coating lowers the coefficient of friction on the braid wire and therefore lowers the potential friction on the tissue, thereby leading to less damage.

d. Polymer Electrospinning Onto Braid

In some embodiments, the medical device comprises a tubular member comprising a proximal disc portion at a proximal end, a distal disc portion at a distal end, and a waist member extending between the proximal disc portion and the distal disc portion, wherein the tubular member has an expanded configuration when deployed at the target site and a reduced configuration for delivery to the target site, and wherein the tubular member comprises at least one braided layer, wherein the at least one braided layer comprises a polymeric fabric coating located on an outside surface of the braided layer, wherein the polymeric fabric coating is deposited on the outside surface of the braided layer through an electrospinning process. In some embodiments, the friction of the medical device on the cardiac tissue is eliminated or reduced by decreasing a surface roughness of the medical device.

In some embodiments, through the use of an electrospinning process, a thin layer of fabric is deposited on the outside surface of the braid, and more evenly applies pressure to cardiac tissue and lowers the coefficient of friction (depending on material) of the device. The electrospinning process involves the spinning of the device (e.g., occluder) and dispensing a liquid polymer into the electrical field within which the device is contained. This results in a non-woven fabric conformed to the shape of the device. During spinning, the device is stretched or non-stretched depending on the need. The benefits of this embodiment include that the fabric does not need to be sewn on, the fabric could cover the whole device or part, the thickness is tailored to the need, and like the other fabric solutions, the coefficient of friction is reduced along with the device abrasiveness against the tissue.

Figure 4:
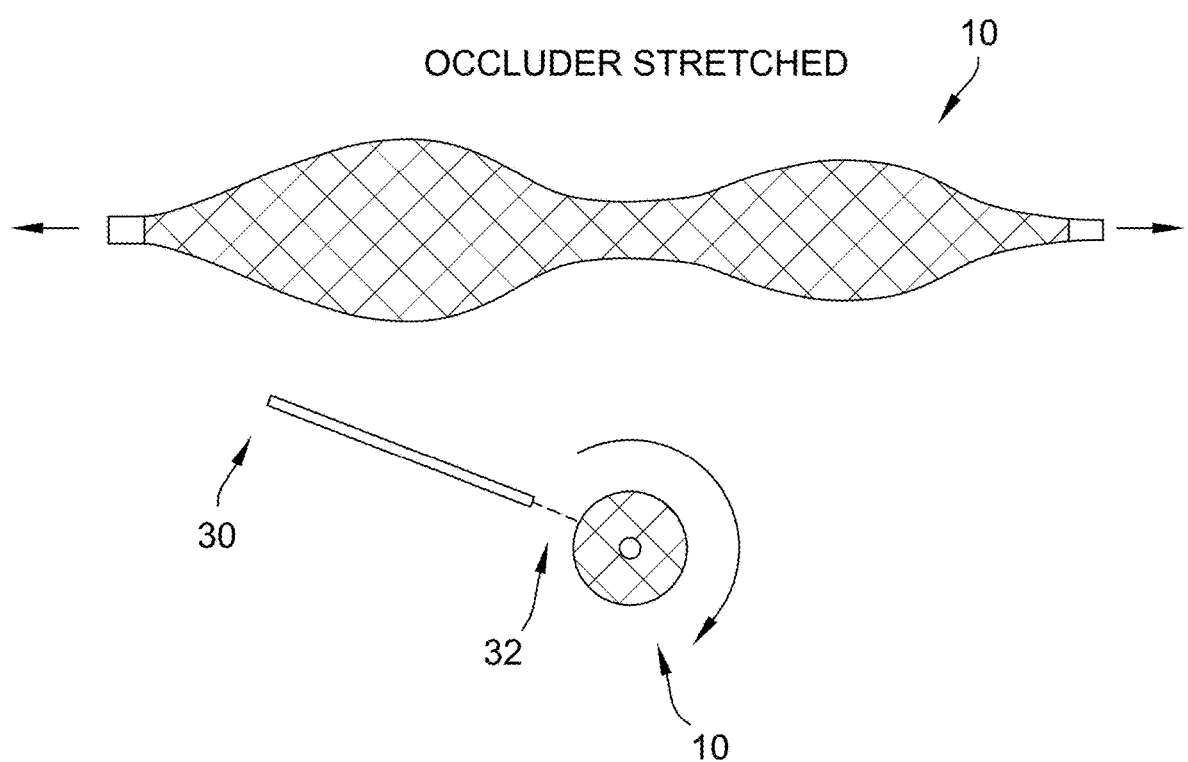
FIG. 4 is an exemplary embodiment of an electrospinning process done to coat a braid in accordance with the present disclosure.

FIG. 4 depicts an exemplary embodiment of a device 10 with an electrospun coating applied, using a needle 30 to apply the polymer fabric 32 to the device 10.

In some embodiments, the fabric coating has a thickness of from about 0.0005 inches to about 0.005 inches. In some embodiments, the fabric coating comprises a non-woven fabric. In some embodiments, the fabric coating conforms to the shape of the medical device.

In some embodiments, the medical device is stretched during the electrospinning. In some embodiments, the medical device is not stretched during the electrospinning. In some embodiments, the electrospinning includes spinning the medical device and dispensing a liquid polymer into an electrical field within which the medical device is contained.

The electrospinning process is used to apply the coating to the braid, which creates a porous structure that is dense enough to occlude the defect. The pores promote tissue ingrowth. In some embodiments, a urethane-based polymer is used for this application; however, several other polymers can also be electrospun, including, but not limited to, nylon, polypropylene, PVA, PTFE and polyester. In some embodiments, the materials used in biomedical electrospinning include, but are not limited to, polyglycolic acid (PGA), PEG, PU, poly(lactic acid)(PLA), poly(ethylene-co-vinyl acetate) (PEVA), polycaprolactone (PCL), poly-1-lactide (PLLA), and polyvinyl alcohol (PVA), poly ε-caprolactone (PCL), salicylic acid (SA), polyethylene glycol-poly(lactic acid), poly(propylene glycol) (PPG),poly-L-lactide-co-ε-caprolactose (PLLA-CL-); and, poly-lactide-co-glycolid (PLGA).

e. Lubricious Ceramic Coating

In some embodiments, the medical device comprises a tubular member comprising a proximal disc portion at a proximal end, a distal disc portion at a distal end, and a waist member extending between the proximal disc portion and the distal disc portion, wherein the tubular member has an expanded configuration when deployed at the target site and a reduced configuration for delivery to the target site, and wherein the tubular member comprises at least one braided layer and has an expanded configuration when deployed at the target site and a reduced configuration for delivery to the target site, wherein the at least one braided layer comprises a ceramic coating on an outside surface of the braided layer. In some embodiments, the friction of the medical device on the cardiac tissue is eliminated or reduced by decreasing a surface roughness of the medical device.

In other embodiments, the coating is a platinum coating, which reduces friction, increases radio-opacity, increases corrosion resistance and reduces nickel leaching.

Through the use of vacuum-based processes like physical vapor deposition (PVD), chemical vapor deposition (CVD), in some embodiments the surface is coated by materials like diamond-like carbon and titanium nitride, and a thin layer of coating is deposited on the outside surface of the braid, which lowers the coefficient of friction of the medical device. In particular, deposition processes, like PVD, CVD involve controlled deposition of thin layers under vacuum conditions. The technology involves deposition of coating by using single material or mixture of materials like gases (methane, argon or titanium and nitrogen) to form thin layers of lubricious coating. One of the benefits of these embodiments is that the device can be coated after forming, just covering the wires without affecting the open cells between the braid wires. The coefficient of friction is reduced along with the device abrasiveness against the tissue.

In some embodiments, the ceramic coating comprises at least one of diamond-like carbon, titanium nitride, titanium carboNitride (TiCN) zirconium nitride (ZrN), titanium niobium nitride (TiNbN), chromium nitride (CrN), and titanium oxide.

In some embodiments, the coating has a thickness of from about 10 nm to about 2 μm.

In some embodiments, the coating is applied through physical vapor deposition (PVD) or chemical vapor deposition (CVD). In some embodiments, the medical device is coated after forming.

Increasing Medical Device Compliance

In some embodiments of the present disclosure, the medical devices disclosed herein reduce and/or eliminate erosion of cardiac tissue while maintaining the fundamental function and effectiveness of an occluder (such as, for example, an Amplatzer™ Septal Occluder (ASO)). In some embodiments, the medical devices achieve this objective by increasing the medical device compliance to cardiac structures and movement.

By increasing medical device (e.g., occluder) compliance, the device moves more freely with device tissue, thus reducing normal forces between the disc and the tissue as well as device movement relative to the tissue. Through reduction of normal forces and device-tissue movement, the frictional interaction between the device and tissue decreases and thus also does the likelihood of erosion.

a. 144 or 288 Wire Braid

In some embodiments, the medical device comprises a tubular member comprising a proximal disc portion at a proximal end, a distal disc portion at a distal end, and a waist member extending between the proximal disc portion and the distal disc portion, wherein the tubular member has an expanded configuration when deployed at the target site and a reduced configuration for delivery to the target site, and wherein the tubular member comprises at least one braided layer, wherein the at least one braided layer comprises a wire braid design between a 72 wire braid design and a 288 wire braid design. In some embodiments, the medical device compliance on cardiac tissue is increased by lowering a stiffness of the at least one braided layer.

In some embodiments, the use of 144 or 288 wire braid results in the use of lower diameter (softer) wire and more evenly spreads out surface contact forces than, for example, a 72 wire braid by increasing the braid density. 144 or 288 wire braid increases device compliance and reduces friction on the tissue. In particular, increasing the wire count from 72 to 144 (or 288) wire braid necessitates the use of a lower diameter wire in order to keep similar functional properties to other medical devices. By utilizing a 144 or 288 wire braid, the braid opening cell size significantly decreases, allowing for less forceful tissue contact via a greater functional surface area. By allowing lower wire diameters, the compliance of the medical device increases by lowering the wire stiffness.

In some embodiments, the wire braid design comprises from about 12 wire braid to about 288 wire braid and all possible wire braid embodiments inbetween, including, but not limited to, 12 wire braid, 16 wire braid, 32 wire braid, 36 wire braid, 54 wire braid, 72 wire braid, 96 wire braid, 144 wire braid, or 288 wire braid. In some embodiments, one braided layer (such as an inner layer) comprises a lower wire braid and another braided layer (such as an outer layer) comprises a higher wire braid.

In some embodiments, the at least one braided layer has a wire diameter of from about 0.001 inches to about 0.012 inches.

b. Multiple Braid Layers with Differing Layer Geometries

In some embodiments, the medical device comprises a tubular member comprising a proximal disc portion at a proximal end, a distal disc portion at a distal end, and a waist member extending between the proximal disc portion and the distal disc portion, wherein the tubular member has an expanded configuration when deployed at the target site and a reduced configuration for delivery to the target site, and wherein the tubular member comprises multiple braided layers, wherein each braided layer comprises a unique layer geometry relative to the other braided layers of the multiple braided layers. In some embodiments, the medical device compliance on cardiac tissue is increased by softening edges of the disc portions and strengthening the waist member.

In some embodiments, adding an additional inner layer of braid with a full-size waist but smaller disc diameters helps strengthen the self-centering mechanism while allowing the discs to remain compliant. In particular, by including multiple layers of braid, with (potentially) different wire diameters, wire counts and separate geometries, they may be used in order to soften the disc edges while strengthening the device waist. With only a single layer of braid at the disc edges, the clamping force exerted near the edge is lower than a device with thinner wires on the outer layer and the disc edge is softer and thus less traumatic to heart tissue.

In some embodiments, a second braided layer provides a second layer to the entire waist member. In other embodiments, a third, fourth, fifth or more braided layers cover the entire waist member, each of differing wire diameters and wire counts. By including in the waist member a second layer the self-centering mechanism may be strengthened without additional stiffening of the discs. With only a single layer of braid at the discs, the clamping force exerted near the disc edge is the same or higher than a device with similar thinner wires but lacking the reinforced waist (due to the stiffer waist pulling the ends toward the center of the device).

Figure 5A:
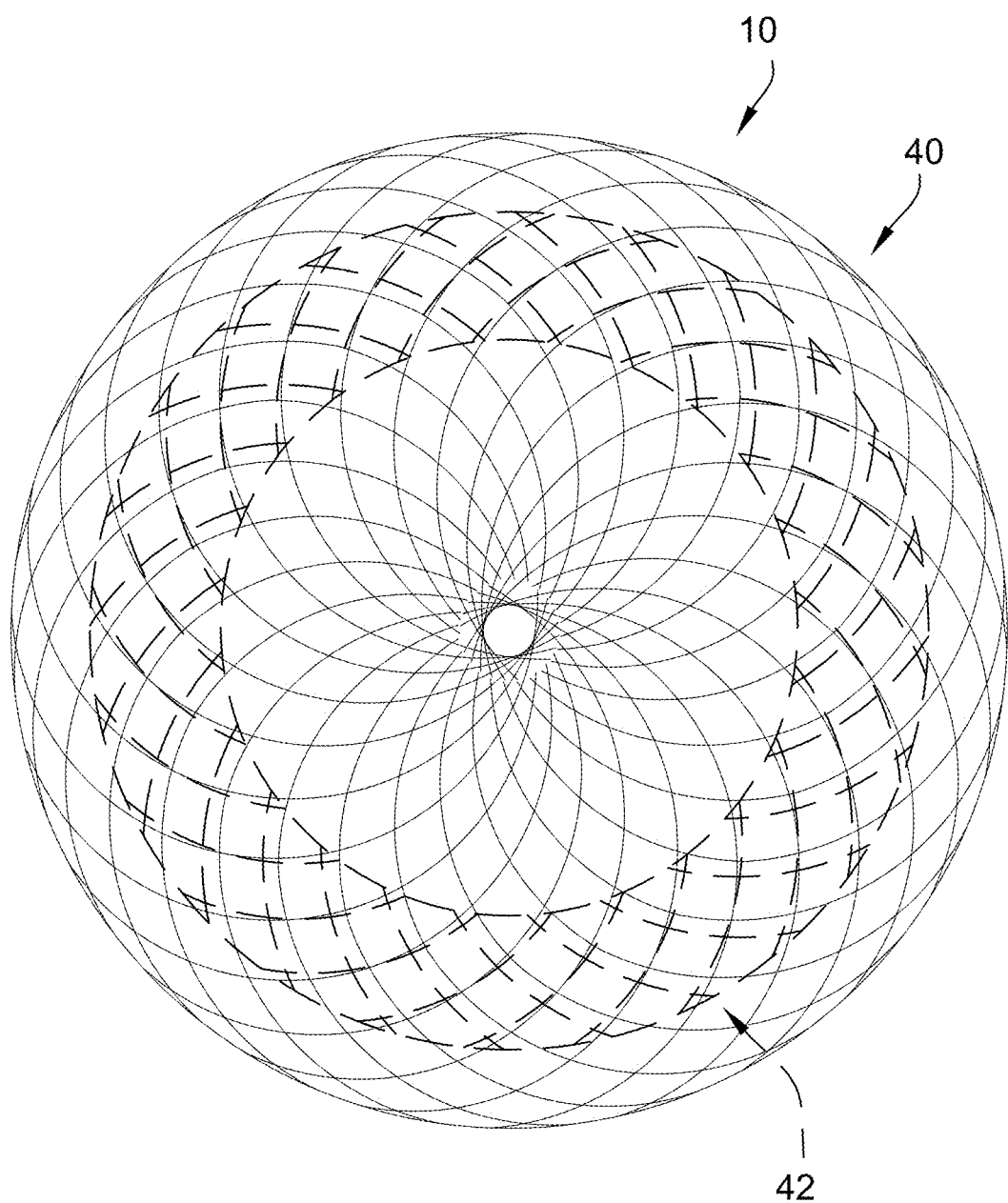
FIGS. 5A and 5B depict exemplary embodiments of an occluder configuration that has two layers with different diameter discs in accordance with the present disclosure.
Figure 5B:
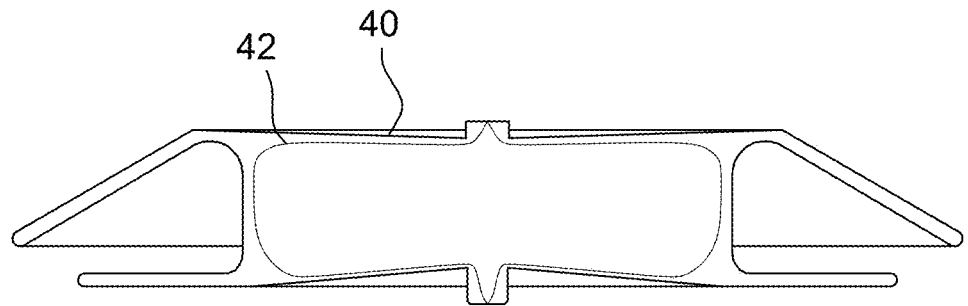

In some embodiments, as shown in FIGS. 5A and 5B, the occluder 10 has a configuration that has two layers with different diameter discs, with the inner layer 42 having smaller discs than the outer layer 40 (by necessity). The occluder waist is the same size for both layers. Wire numbers in the braid are varied with additional wires on the outside layer 40 to increase tissue contact surface area and fewer wires on the inside layer 42 to reduce bulk. It is also possible, in some embodiments, to have fewer wires on the outside layer 40 and more wires on the inside layer 42.

Figure 5C:
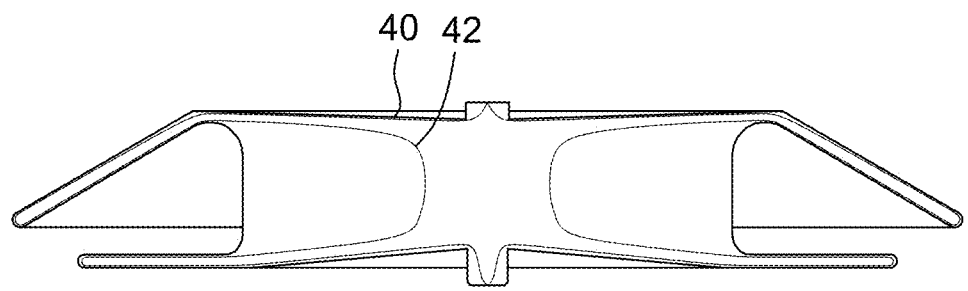
FIG. 5C is an exemplary embodiment of an occluder configuration with the inner layer braid matching the disc diameters of the outer layer but with a waist of the inner layer having a smaller diameter than the outer layer in accordance with the present disclosure.

In some embodiments, as shown in FIG. 5C, the inner layer 42 braid matches the disc diameters of the outer layer 40, but the waist of the inner layer 42 has a smaller diameter than the outer layer 40. This allows greater independent movement of the discs. Additionally, another embodiment would be for the inner layer to be braided wire and the outer layer to be a braided, knit, woven or non-woven fabric.

Figure 5D:
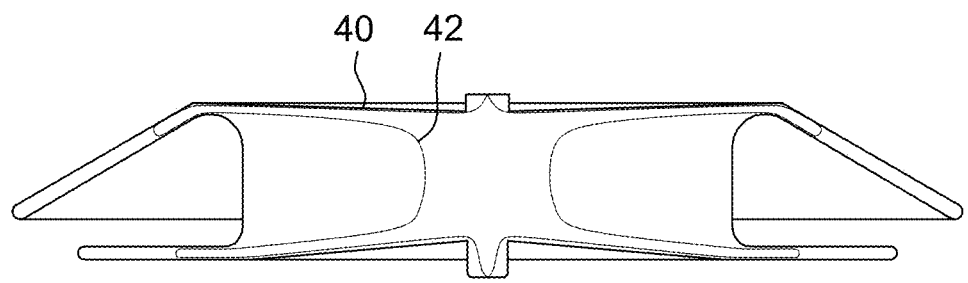
FIG. 5D is an exemplary embodiment of an occluder configuration with an inner layer having discs and a waist with smaller diameters than the outer layer in accordance with the present disclosure.

In still other embodiments, a combination of the two embodiments shown in FIG. 5D is disclosed. That is, the inner layer 42 has discs and a waist with smaller diameters than the outer layer 40. This provides a softer waist and disc edge than other devices, while providing more clamping force due to the stiff inner discs. Additionally, the soft outer waist moves more easily when external force is exerted on the disc, which allows the entire device to move away from the anatomy that is exerting the external force (such as the aorta), thus reducing the force imparted by the device discs on the anatomy.

Figure 5E:
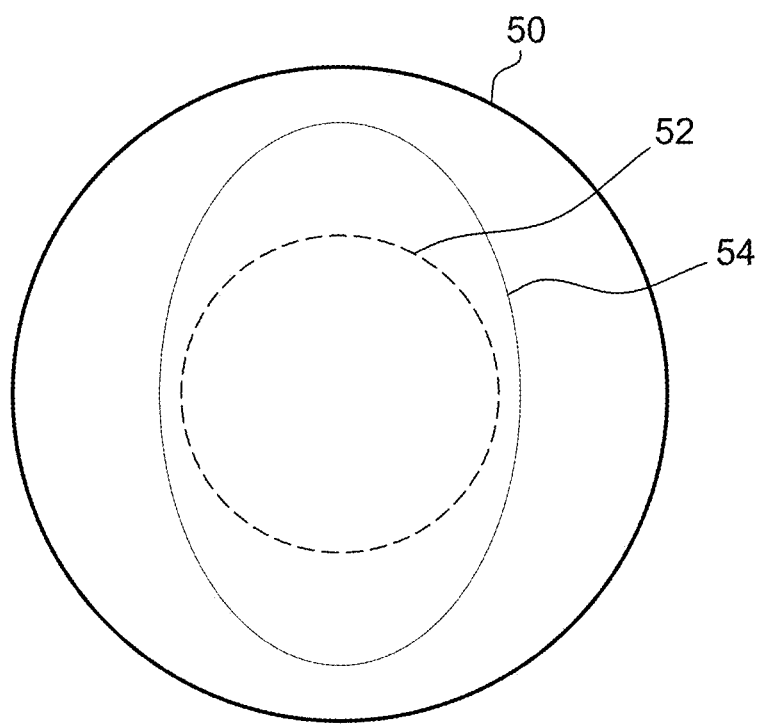
FIG. 5E is an exemplary embodiment of an occluder configuration in accordance with the present disclosure.

FIG. 5E depicts an inner layer 54 surrounding the waist 52 and within the outer layer 50. The inner layer 54 is oval-shaped and the outer layer 50 is configured to be aligned to an aorta/superior area of a septal defect. In some embodiments, the inner layer is oblong-shaped, or any shape similar to that of an oval. In some embodiments, the major diameter of the inner layer extends part or all of the way to the outer braid layer, and the minor diameter of the inner layer extends anywhere from the waist diameter to a location near the outer layer. These embodiments can be orientation-dependent to be aligned to the aorta with the delivery system, or deployed into the left or right atrium for alignment before recapturing the device, aligning it, and redeploying it. In some embodiments, this is achieved using radiopaque markers on portions of the device to indicate the direction of alignment.

In all of the above-mentioned embodiments, the wire diameters also may vary within each layer and between layers, and the wire counts may vary between layers.

c. Varying Braid Wire Thickness Through Material Removal

In some embodiments, the medical device comprises a tubular member comprising a proximal disc portion at a proximal end, a distal disc portion at a distal end, and a waist member extending between the proximal disc portion and the distal disc portion, wherein the tubular member has an expanded configuration when deployed at the target site and a reduced configuration for delivery to the target site, and wherein the tubular member comprises at least one braided layer with material removed from a portion thereof, wherein the portion of the braided layer with material removed comprises a smaller braid wire diameter at the proximal disc portion and the distal disc portion than at the waist member. In some embodiments, the medical device compliance on cardiac tissue is increased while maintaining a self-centering strength of the medical device.

In some embodiments, electropolishing the distal and proximal discs (without polishing the waist) creates a lower braid wire diameter in a localized region of the disc while maintaining the wire diameter on the waist. This allows increased disc compliance while maintaining the self-centering mechanism's strength. In some embodiments, however, the waist member is not electropolished.

In some embodiments, the braid wire diameter at the proximal disc portion is from about 0.001 inches to about 0.012 inches. In some embodiments, the braid wire diameter at the distal disc portion is from about 0.001 inches to about 0.012 inches. In some embodiments, the braid wire diameter at the waist member is from about 0.001 inches to about 0.012 inches.

In some embodiments, varying the braid wire thickness through targeted material removal (microblasting, acid, electropolishing, or some combination thereof) reduces the forces exerted by portions of the device (the edge of the left atrial disc 12 and/or the right atrial disc 14) while maintaining strength of other parts of the device (the radial force of the waist member 16 and interior portions of the discs 12, 14 for self-centering, and clamp force/embolization resistance). The amount of material removal depends on the required reduction of force exerted by the edge of the disc 12, 14. For example, if each braid wire starts at 0.007 inches in diameter, removing material from a portion 13, 15 of the discs 12, 14 until the wire diameter is 0.002 inches at the edges of the discs significantly reduces the force exerted on the anatomy after implanting the device 10 (see, e.g., FIGS. 6A and 6B). In addition, depending on how the device is masked during manufacturing, the material removal is focused on discrete areas, or, in some embodiments, is a gradual transition.

Material removal can be performed from the ends of the device to an area near the waist, or it can be performed at the edges of the discs only, after the device is formed; this decision will be based on manufacturability and the force requirements of the device.

d. Independent Waists

In some embodiments, the medical device comprises a tubular member comprising a proximal disc portion at a proximal end, a distal disc portion at a distal end, and a waist member extending between the proximal disc portion and the distal disc portion, wherein the tubular member comprises at least one braided layer and has an expanded configuration when deployed at the target site and a reduced configuration for delivery to the target site, wherein the tubular member further comprises a proximal transition segment and a distal transition segment, wherein the proximal transition segment connects the proximal disc portion to the waist member and the distal transition segment connects the distal disc portion to the waist member, and further wherein each of the proximal transition segment and the distal transition segment has a smaller diameter than the waist member. In some embodiments, the medical device compliance on cardiac tissue is increased through greater transitional movement of the disc portions relative to the waist member.

Figure 7A:
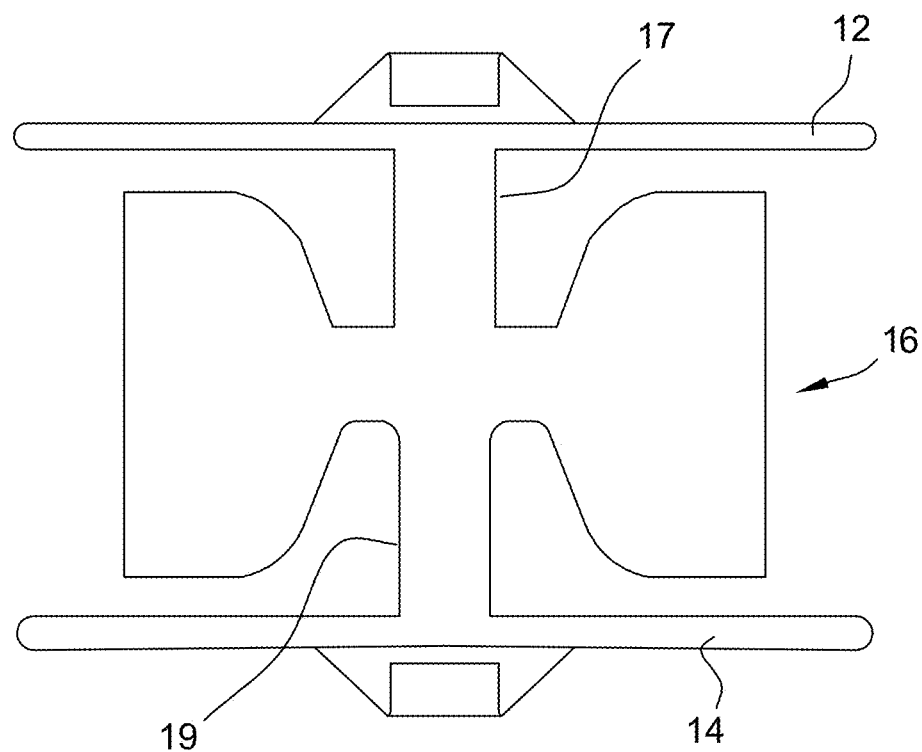
FIGS. 7A and 7B depict exemplary embodiments of occluder configurations having thinner disc waists in accordance with the present disclosure.
Figure 7B:
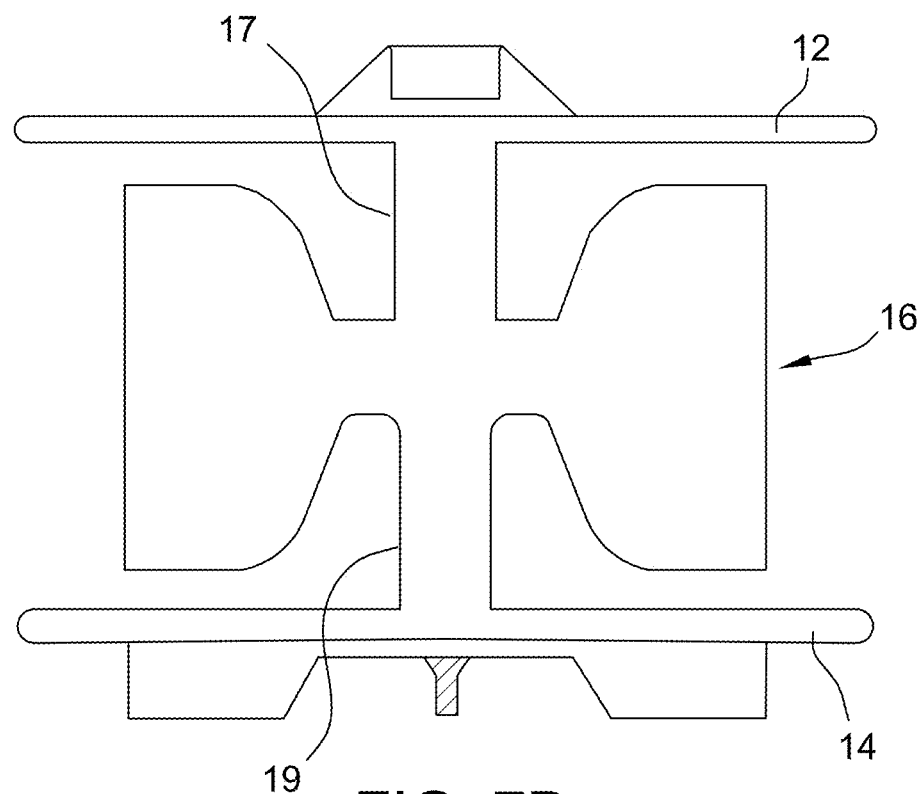

By allowing a thinner connecting section between each disc 12, 14 and the waist member 16, greater disc mobility is achieved by allowing more disc motion relative to the waist member 16 than is allowed under standard medical devices. In particular, shaping the braid to have discs 12, 14 connected to the waist member at transition segments 17, 19 having a much smaller profile, allows significantly greater translational movement of the discs 12, 14 relative to the waist member 16, and allows the discs 12, 14 to shift up against a cardiac structure (e.g., wall, aorta) (see, e.g., FIGS. 7A and 7B).

In some embodiments, the diameter of the proximal transition segment 19 is from about 1 mm to about 5 mm. In some embodiments, the diameter of the distal transition segment 17 is from about 1 mm to about 5 mm. In some embodiments, the waist member has a diameter 16 of from about 2 mm to about 60 mm.

e. Disc Edge Shape

In some embodiments, the medical device comprises a tubular member comprising a proximal disc portion at a proximal end, a distal disc portion at a distal end, and a waist member extending between the proximal disc portion and the distal disc portion, wherein the proximal disc portion and the distal disc portion comprise an edge geometry selected from the group consisting of a tapered shape, a cup shape, and a round shape, and further wherein the tubular member comprises at least one braided layer and has an expanded configuration when deployed at the target site and a reduced configuration for delivery to the target site. In some embodiments, the medical device compliance on cardiac tissue is increased by deflecting compression forces away from the center of the medical device.

Figure 8A:
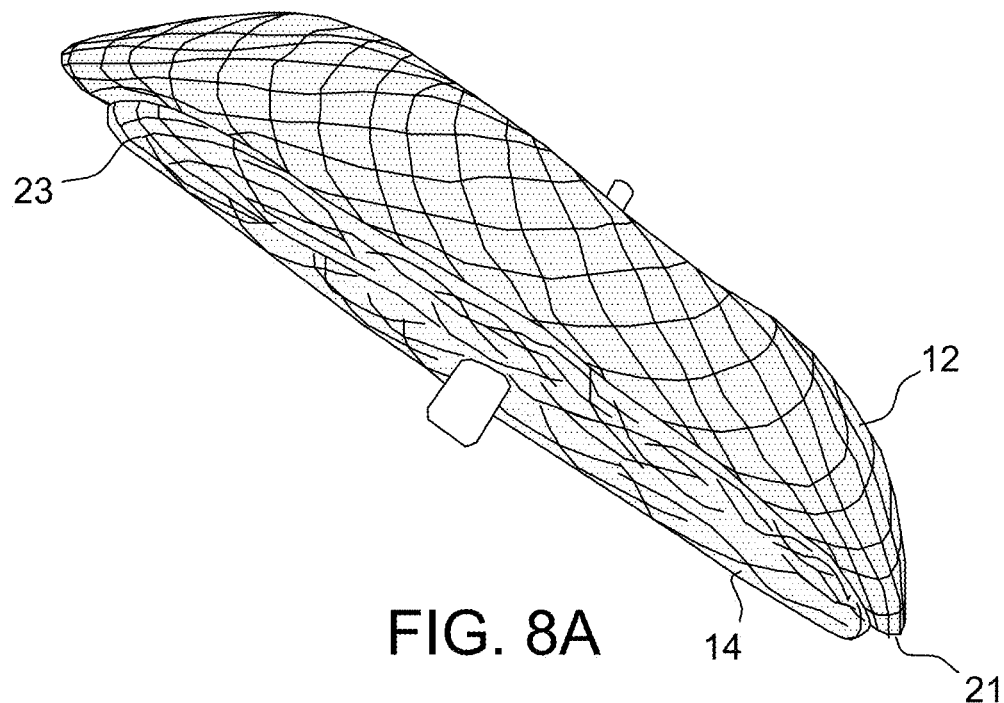
FIGS. 8A, 8B and 8C depict exemplary embodiments of occluder configurations that are currently used.
Figure 8B:
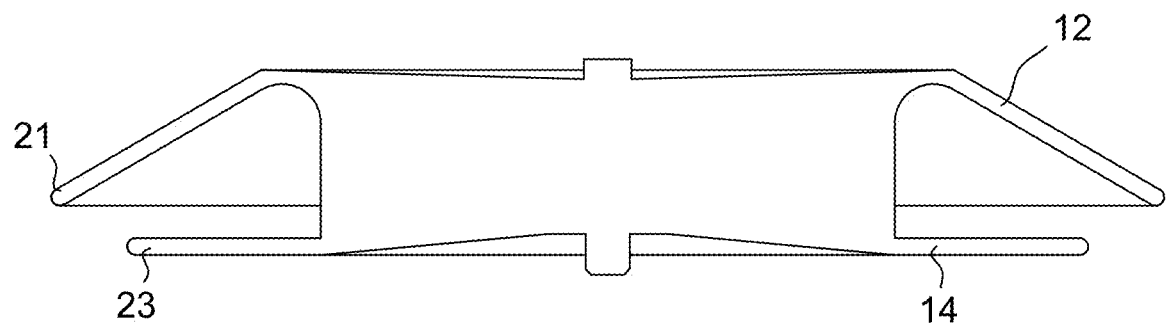
Figure 8C:
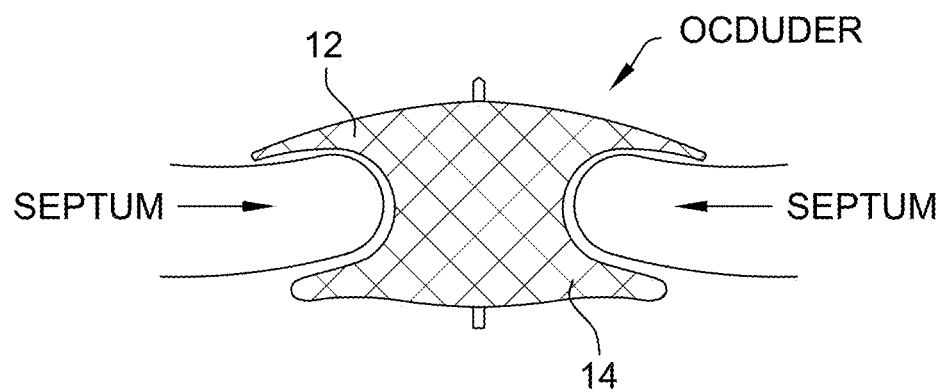

FIGS. 8A, 8B and 8C are exemplary embodiments of an occluder shape configuration in the industry. By rounding an edge 21 and/or 23 of the disc 12 and/or disc 14, utilizing a modified contact angle, creating a tapered shape or other (e.g., a cup shape), the interaction of the disc(s) 12, 14 with the cardiac tissue significantly improves with more compliant edges 21, 23. In particular, forming different edge geometries on the medical device provides significant benefits in reducing compression forces on the tissue by spreading them over a wider area or allowing the device to accommodate dynamic anatomical movements.

Figure 9A:
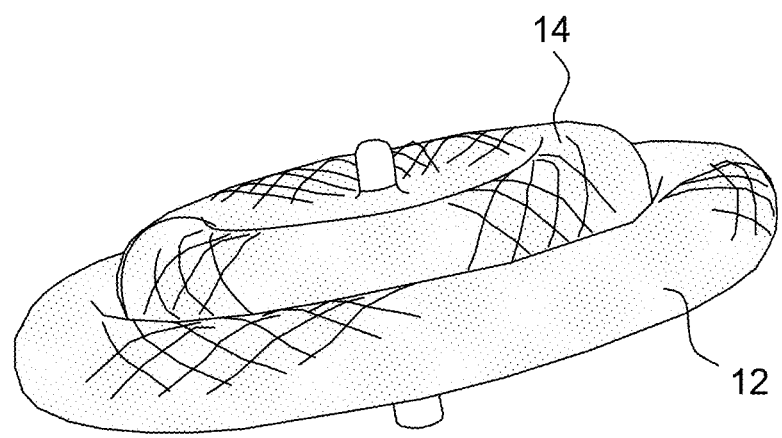
FIGS. 9A and 9B depict an exemplary embodiment of an occluder configuration having rounded disc edges in accordance with the present disclosure.
Figure 9B:
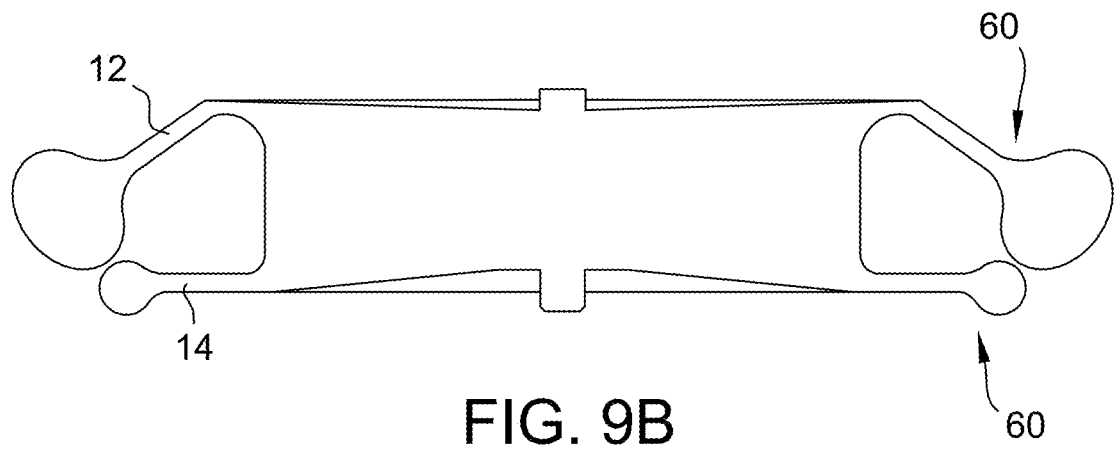

In accordance with the present disclosure, in some embodiments, at least one of the proximal disc portion 14 and the distal disc portion 12 comprise an edge geometry consisting of a round shape 60 (see, e.g., FIGS. 9A and 9B). A rounded edge 60 more evenly spreads the device's wires against an adjacent compressing tissue, and, further, does not create a sharp edge where the outermost part of the disc contacts tissue.

Figure 9C:
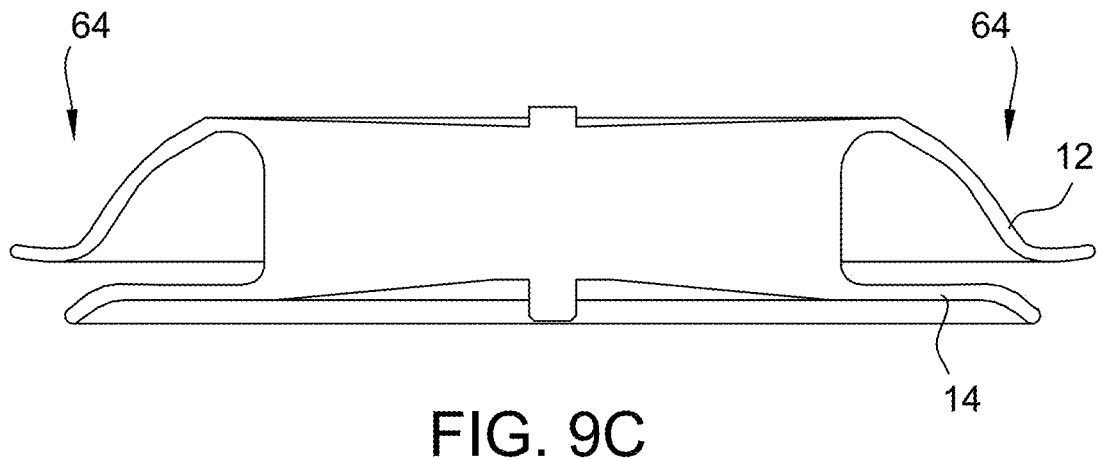
FIG. 9C is an exemplary embodiment of an occluder configuration having tapered-shaped disc edges in accordance with the present disclosure.

In some embodiments, at least one of the proximal disc portion 14 and the distal disc portion 12 comprise an edge geometry consisting of a tapered shape 64 (see, e.g., FIG. 9C). A tapered shape edge 64 reduces the risk of the device directly protruding into the atrial or aortic structures by deflecting compression forces away from the disc 12, 14 or disc centers.

Figure 9D:
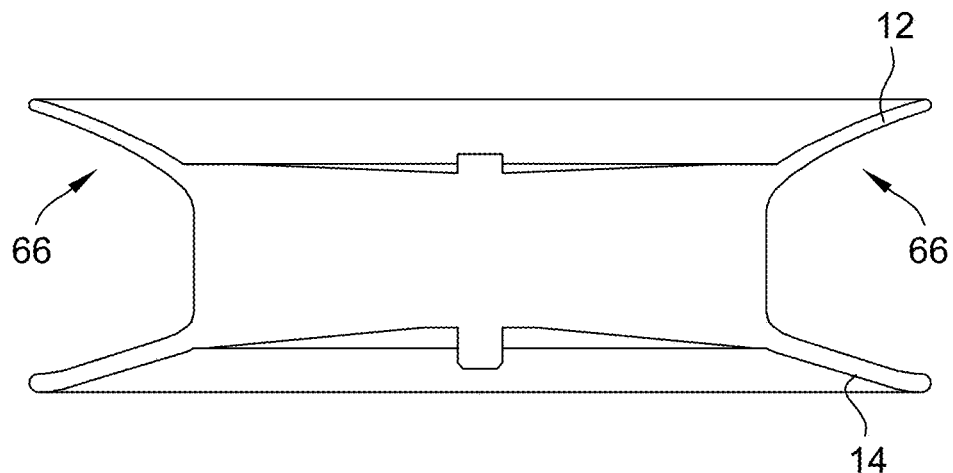
FIG. 9D is an exemplary embodiment of an occluder configuration having hourglass-shaped disc edges in accordance with the present disclosure.

In some embodiments, at least one of the proximal disc portion 14 and the distal disc portion 12 comprise an edge geometry consisting of an hourglass-shape 66 (see, e.g., FIG. 9D). The hourglass-shape 66 keeps the discs 12, 14 away from the cardiac tissue.

Figure 9E:
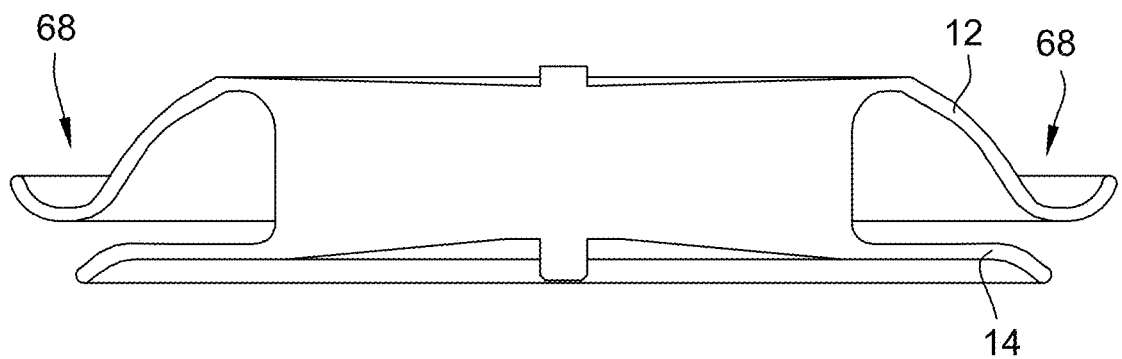
FIG. 9E is an exemplary embodiment of an occluder configuration having cup-shaped disc edges in accordance with the present disclosure.

In some embodiments, at least one of the proximal disc portion 14 and the distal disc portion 12 comprise an edge geometry consisting of a cup shape 68 (see, e.g., FIG. 9E). A cup shape edge 68 reduces the risk of the device directly protruding into the atrial or aortic structures by deflecting compression forces away from the disc 12, 14 or disc centers.

f. Non-Circular Braid Design

In some embodiments, the medical device comprises a tubular member comprising a proximal disc portion at a proximal end, a distal disc portion at a distal end, and a waist member extending between the proximal disc portion and the distal disc portion, wherein the tubular member comprises at least one braided layer comprises a non-circular braid design, and wherein the tubular member has an expanded configuration when deployed at the target site and a reduced configuration for delivery to the target site. In some embodiments, the medical device compliance on cardiac tissue is increased by the medical device avoiding high risk areas of the cardiac anatomy.

By changing the medical device (e.g., occluder) braid design to be other than circular, the high risk areas of the cardiac anatomy (the superior rim and aortic rim of the ASD) are avoided altogether to prevent erosions. In particular, the high risk areas of the superior and aortic rims are avoided while still providing a disc or discs of significant enough strength to prevent embolization.

Figure 10A:
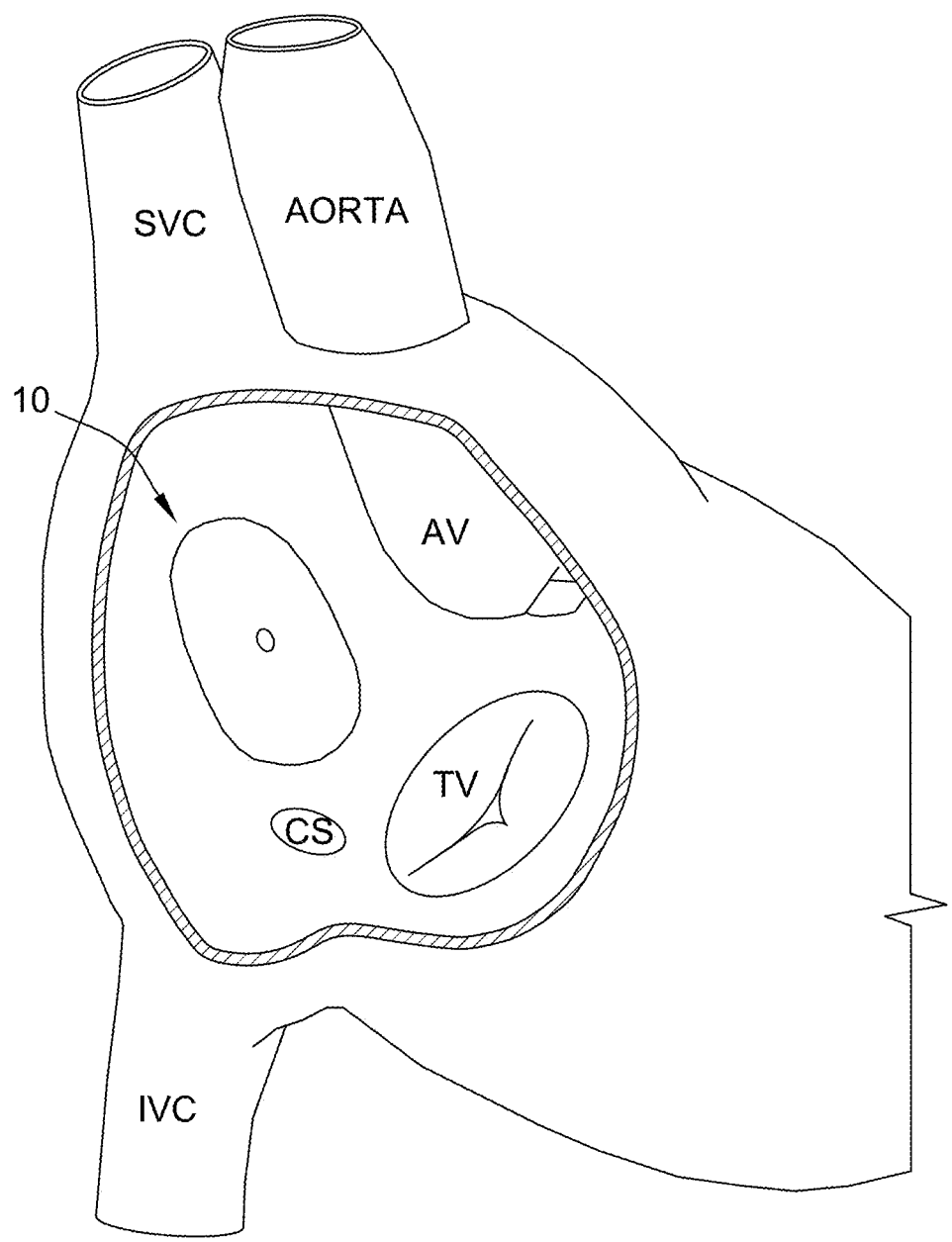
FIG. 10A is an exemplary embodiment of an occluder configuration having a non-circular braid design with an oval shape in accordance with the present disclosure.
Figure 10B:
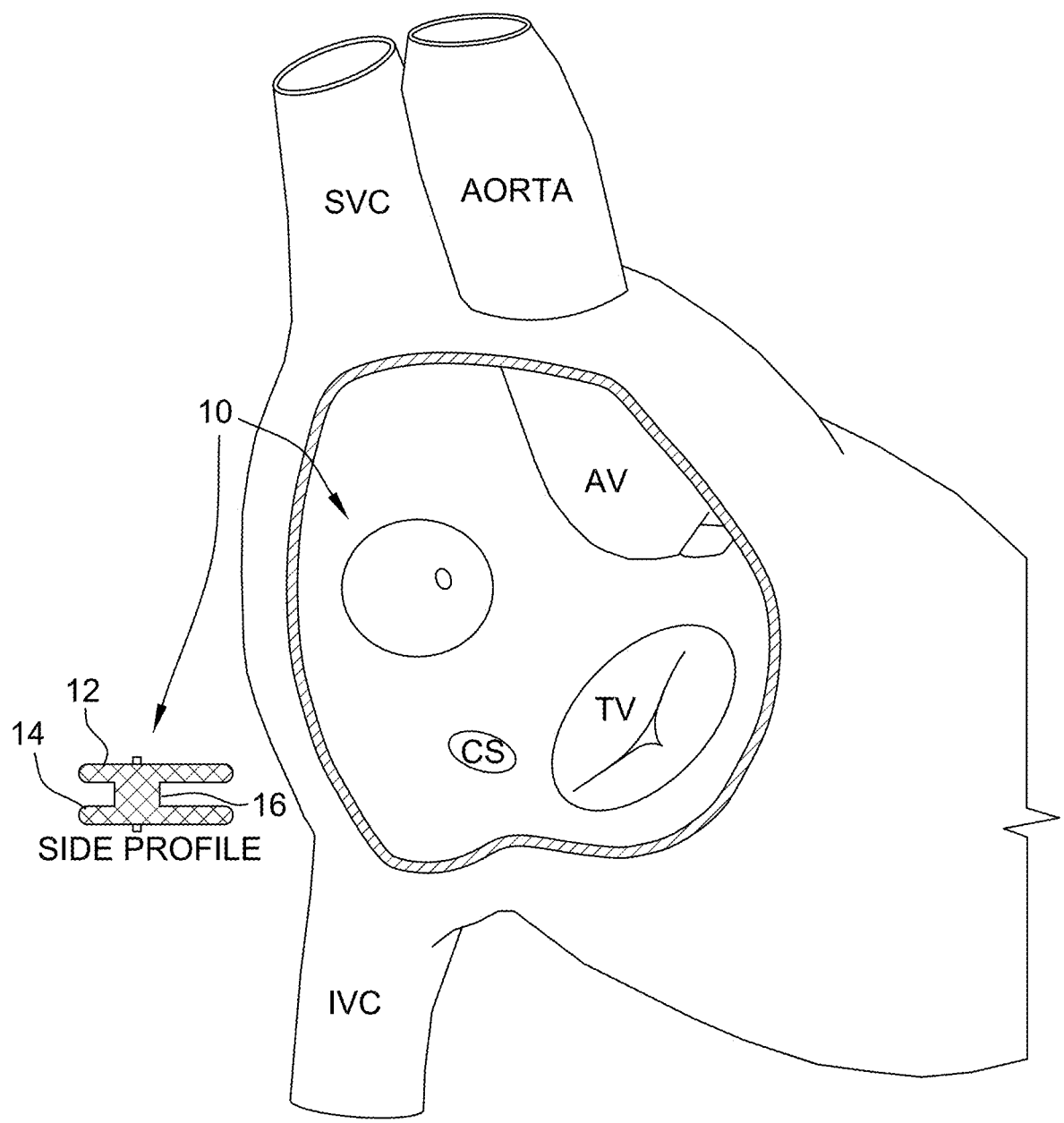
FIG. 10B is an exemplary embodiment of an occluder configuration having a non-circular braid design with offset discs in accordance with the present disclosure.

In some embodiments, as shown in FIG. 10A, the device 10 has a braid design in the shape of an oval. In some embodiments, as shown in FIG. 10B, the braid design is circular with the discs 12, 14 offset from the waist member 16. In some embodiments, as shown in FIG. 10C, the device has a braid design in an irregular kidney shape.

In some embodiments, as shown in FIG. 10B, the device 10 has discs 12, 14 that are offset and extend more in one direction.

Figure 10C:
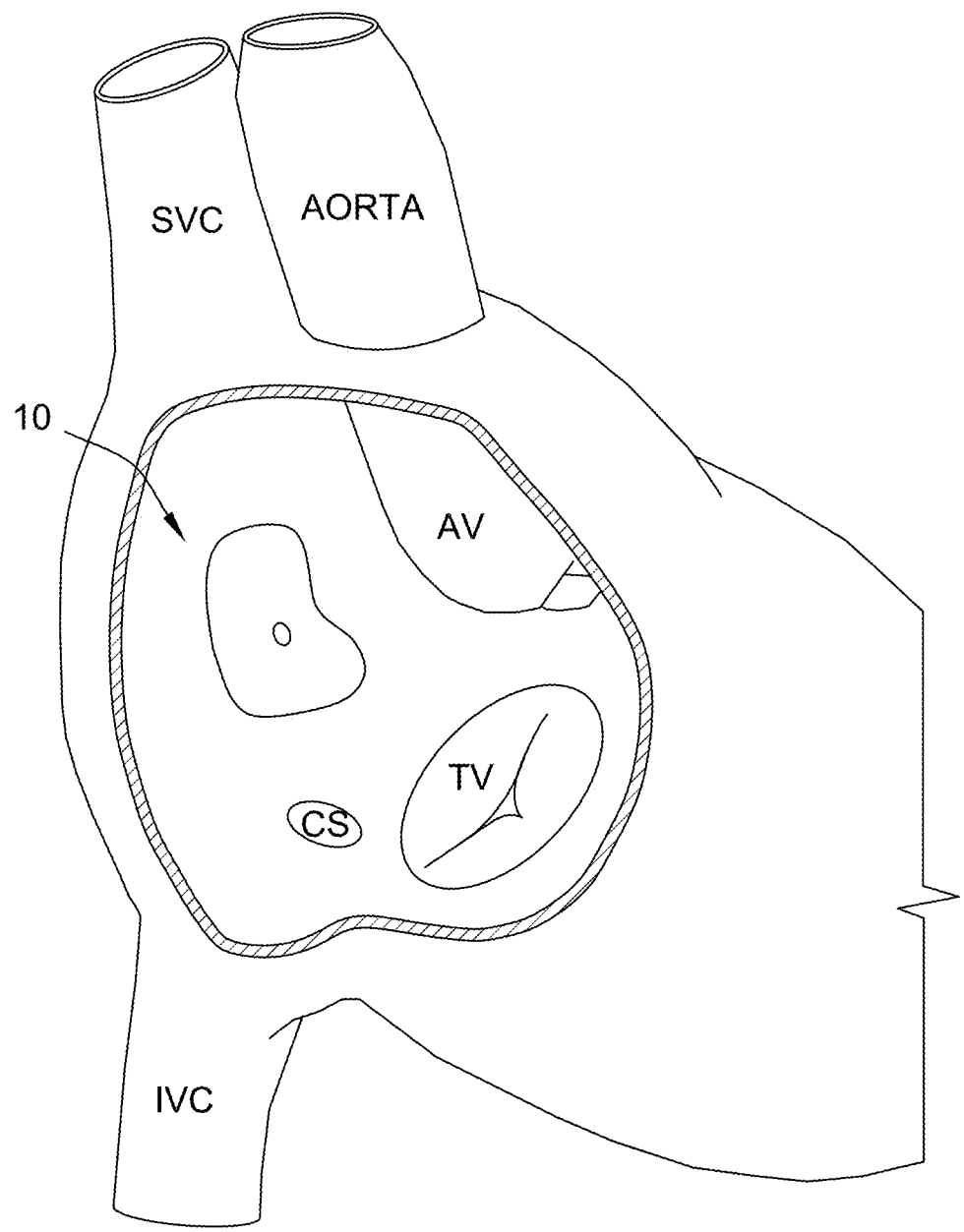
FIG. 10C is an exemplary embodiment of an occluder configuration having a non-circular braid design where the braid enters on the side that is towards the aorta such that it can go around or saddle the aorta in accordance with the present disclosure.

In some embodiments, as shown in FIG. 10C, the device 10 has a braid design that comes in (e.g., is radially concave towards a waist member, not shown in FIG. 10C) on a side that is towards the aorta so that the device 10 can go around or saddle the aorta.

g. Standardizing Disc Force

In some embodiments, the medical device comprises a tubular member comprising a proximal disc portion at a proximal end, a distal disc portion at a distal end, and a waist member extending between the proximal disc portion and the distal disc portion, wherein the tubular member has an expanded configuration when deployed at the target site and a reduced configuration for delivery to the target site, and wherein the tubular member comprises at least one braided layer, wherein the braided layer comprises multiple wire sizes. In some embodiments, the medical device compliance on cardiac tissue is increased by standardizing the forces of the medical device on the cardiac tissue.

Standard occluders have a range of pull through forces, push through forces and edge compression forces due to only a few different wires used to build all of the occluder sizes. Some of the embodiments of the present disclosure utilize additional wire sizes in conjunction with hybrid braids (multiple wires sizes braided together to attain intermediate characteristics) to attain a single disc pull through force, push through force and/or edge compression force. In particular, forces spike each time an occluder wire size increases 0.001 inches in thickness, so in order to smooth any occluder force related characteristics, the new braid configurations of the present disclosure increase compliance to an acceptable level with various occluder designs and ease transitions between wire sizes.

Some occluding devices have wire diameter increases from 0.004 inches to 0.008 inches across the range of device sizes (4 mm-40 mm). As the devices get larger, the wire diameter must also get larger to achieve the necessary resistance to embolization. At times, the wire size increases in 0.001 inch increments, which creates device sizes that are stiffer than others. Utilizing hybrid braids with two different wire sizes, and wire diameters in 0.0005 inch increments, helps normalize the force across the range of device sizes. Normalizing this force also lowers the stiffness of the braid at the edge of the discs, which reduces the risk of erosion.

In some embodiments, a first wire size is from about 0.001 inches to about 0.012 inches. In some embodiments, a second wire size is from about 0.001 inches to about 0.012 inches.

h. Disc Profile

Figure 11A:
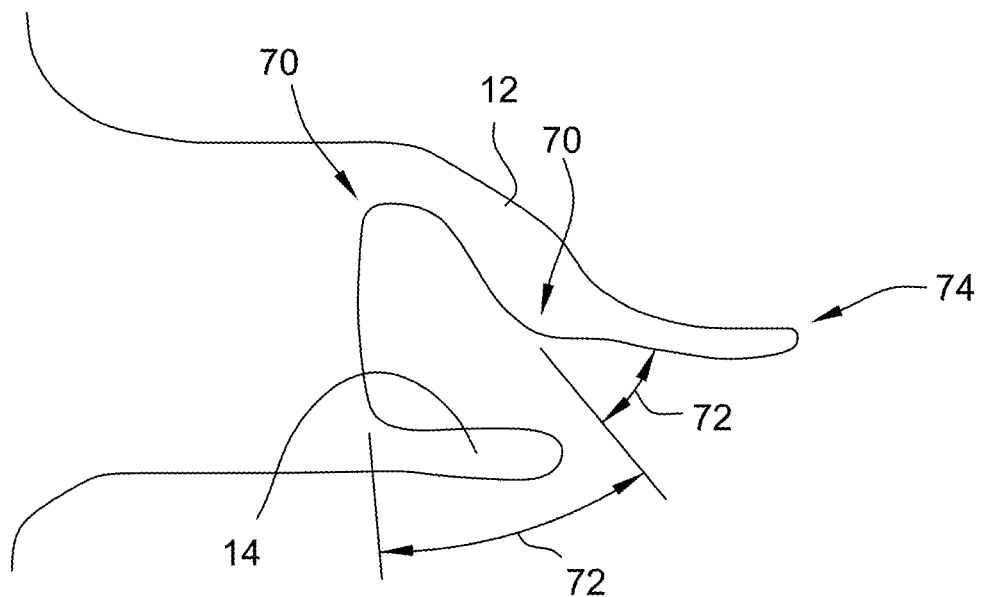
FIGS. 11A and 11B are exemplary embodiments of disc profiles in accordance with the present disclosure.
Figure 11B:
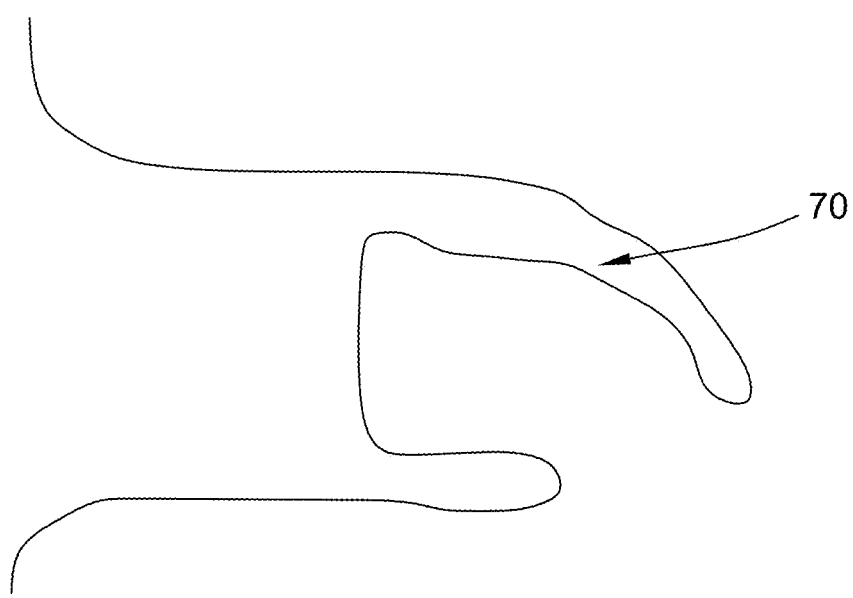

The profile of the disc as it transitions from waist to disc (e.g., including radius and taper angles) affects the clamping forces exerted thereby, and the conformability of the discs. Adjusting this profile provides additional ways of decreasing the braid wire diameters used while maintaining the shape and clamping forces of the device and disc during and after deployment. A few examples, while not all encompassing, are shown in FIGS. 11A and 11B (this configuration applies to both discs 12, 14). FIG. 11A depicts different radii 70 (e.g., measured at different radial locations of the discs) and different taper angles 72 (e.g., measured relative to a previous angular orientation radially inward therefrom), as well as the disc edge shape 74. Another radius 70 (e.g., measured at a different radial location) is also shown in FIG. 11B. In some embodiments, a profile of the disc (e.g., proximal disc, distal disc, or both) is flat, flat with a tapered edge, flat with a slightly tapered edge, or flat with a cup-shaped edge. In embodiments of devices having more than one disc, the discs may each have the same profile or different profiles.

i. Termination Profile

Figure 12:
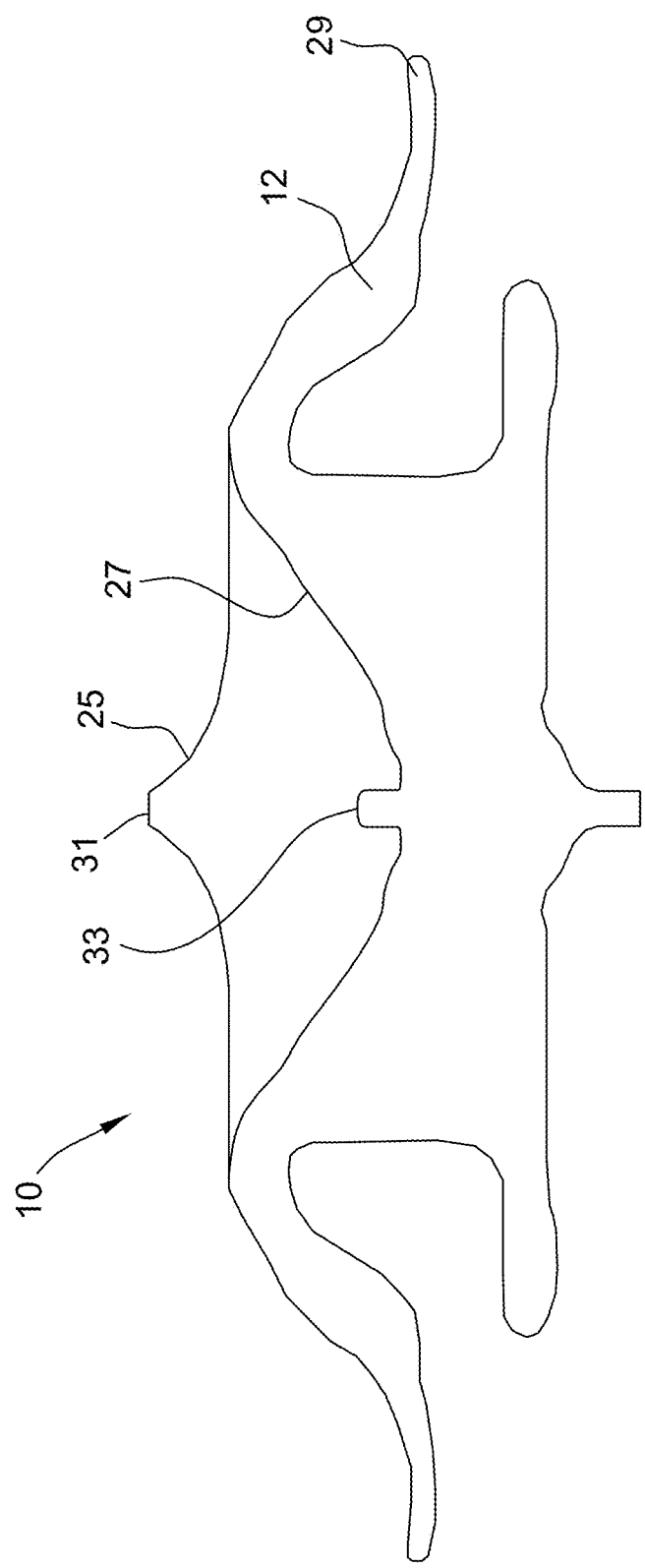
FIG. 12 is an exemplary embodiment of a termination profile in accordance with the present disclosure.

The termination point of the braid and the profile it takes from the discs to each end of the device can be modified to optimize the deployed device profile, and clamping forces of the discs. An example is shown in FIG. 12 (this applies to both discs), depicting two exemplary braid angles or profiles 25, 27 from an edge 29 of the disc 12 to a respective termination point 31, 33 affects disc flexibility, and can be modified to increase/decrease clamping force exerted by the disc 12 and/or the device 10 overall.

Occluding Device Including a Skirt

In some embodiments of the present disclosure, the occluding device includes an external skirt for sealing and cushioning. Structural heart occluders (herein referred to as occluders) are utilized to seal clinically undesirable holes, vascular connections, and appendages within the heart and vasculature, such as an atrial septal defect (ASDs), a patent foramen ovale (PFO), a ventricular septal defect (VSD), a left atrial appendage (LAA), a paravalvular leak channel (PVL), a patent ductus arteriosus (PDA), or an anomalous vascular malformation (AVM). The ASD, PFO, VSD, PVL, PDA, and AVM occluders have a central waist along with two retention discs, while the LAA occluder has a lobe with one disc. To ensure adequate sealing and retention of the occluder, an occluder with a size larger than the structure being occluded is selected for implant. However, usage of a larger size device may sometimes result in complications due to interference with other structures, such as device erosion, heart block, and valvular dysfunction. At times, physicians may elect to implant a smaller device size to avoid these complications and may subsequently have non-optimal sealing. Therefore, there is an unmet need for having an occluder that may provide better sealing without interfering with other structures.

Specific unmet needs for the various occluders include the following:

ASD Occluder—The occluder size selected must adequately seal the ASD; however, if a large device size is implanted, then the retention discs may erode through the atrial free wall into the aorta and cause life-threatening bleeding into the pericardial space requiring emergency surgical intervention.

Post-Infarct VSD Occluder—A VSD formed following a myocardial infarction is not necessarily circular, and the tissue along the borders of the VSD are likely to be necrotic. If the implanted device size is not sufficiently large a residual leak will develop, which will prevent the patient from being able to recover. However, if a large device is implanted, then the device will exert pressure on the borders of the VSD and may cause additional tissue necrosis with expansion of the VSD.

Membranous VSD Occluder—A VSD in the membranous septum is challenging to seal because an adequately sized device may exert pressure on the electrical conduction system of the heart and cause heart block with the need to implant a pacemaker.

LAA Occluder—The LAA may not have necessarily a circular cross section such that a larger device size may be needed to adequately seal the LAA. If the device size implanted is large and exerts significant pressure on the LAA walls, the retention wires may cause larger perforations of the LAA with more bleeding into the pericardial space. If the device size implanted is too small, then a residual leak may be present, which may also result in formation of a device thrombus and increase the risk for thromboembolic complications.

According to the present disclosure, a smaller size occluder may be selected to avoid at least of the above-described issues. To avoid residual leakage about the occluder, an external skirt is added to the occluder, which improves sealing around the occluder.

Figure 13B:
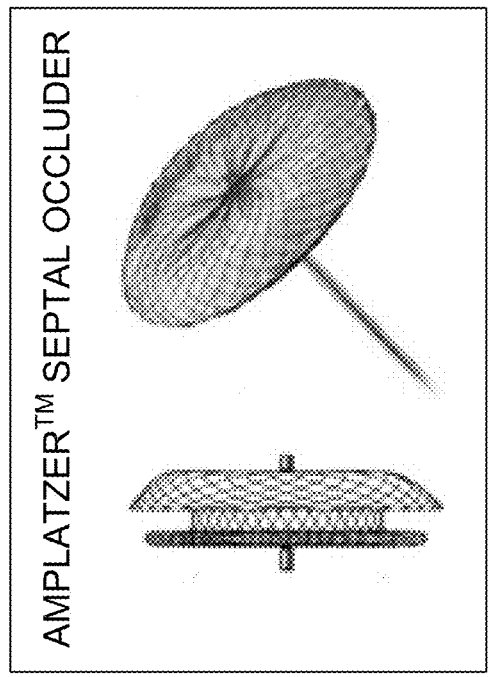
FIG. 13B is an exemplary embodiment of a self-centering occluding device.
Figure 13A:
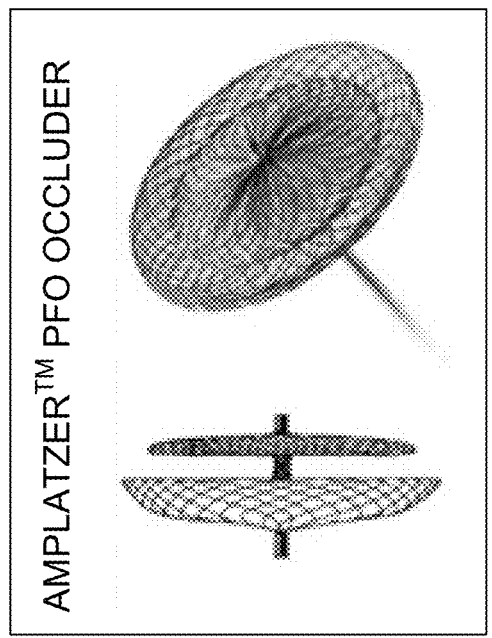
FIG. 13A is an exemplary embodiment of a non-self-centering occluding device.

Occluders may be made of a braided nitinol wire mesh that may easily be collapsed and delivered via a catheter. The braid may be made of multiple layers with various calibers of wires to influence occlusion time and device stiffness. The occluder sometimes may also contain an internal fabric material such as polyester to promote occlusion. The central waist of the occluder may be sized to match the size of the defects or may be smaller than the defect size, in accordance with the present disclosure. There are two current designs of the central waist: (1) A narrow central waist that is not intended to fill the entire defect and that allows the device to freely move within the defect—this design is referred to as non-self-centering (see FIG. 13A); and (2) a wider central waist that is sized to completely fill the defect, which causes the device to remain in a fixed position centered within the defect—this design is referred to as self-centering (see FIG. 13B).

In some embodiments, the central waist of the occluder is designed to be smaller in size (diameter) relative to the size (diameter) of the defect (e.g., an LAA), and an external skirt is added to the central waist to provide improved sealing and cushioning of the occluder. The skirt may be made from either synthetic material (e.g., polyester fabric, PTFE, Gore-Tex™) or preserved tissue (e.g., bovine or porcine pericardium), but may also be made of a fine soft nitinol braid.

The occluder including the skirt has a benefit over at least some known occluders, in that the skirt may more easily conform into an irregular shaped defect (e.g., a non-circular defect) and allows the use of a smaller diameter central waist in selecting the size of the occluder. The skirt provides improved sealing over occluders without such a skirt, and also serves as a protective cushion to surrounding tissue from radial forces exerted on the tissue by the central waist. With improved sealing, the retention disc size may be optimized to minimize interferences with other structures, as described above.

The following table (Table 1) provides a list of the device, unmet needs and solutions in accordance with the present disclosure:

waist. The skirt diameter is chosen to be significantly larger than a diameter of the central waist, to provide redundancy and adequate filling around the central waist. For example, the central waist may be reduced by about 33% in diameter (e.g., compared to the central waist of a conventional occluder without a skirt), and the skirt may have a diameter or size that enables the skirt to fill that reduction in the diameter of the central waist. The thickness of the skirt is optimized to permit an acceptable collapsed device profile within a delivery catheter.

In some embodiments, a single skirt layer is utilized, but in an alternative embodiment, more than one skirt and/or a single skirt including multiple layers may be used. When using multiple skirts, the skirts may be placed one on top of each other, and/or joined to each other using sutures, and may contain a softer material in between (such as Gore-Tex™, which is also waterproof and may enhance the occlusive effect of the occluder) an outermost layer and the central waist or other intermediate layers. Additionally or alternatively, a softer material may be used as an outermost and/or innermost layer. A skirt that includes a soft material for at least one layer thereof may exert relatively less pressure on adjacent tissue and/or may conform relatively more easily to variations of the adjacent tissue.

In at least some embodiments, the skirt could have a pleated design (folds) to allow reduced profile during delivery and allows sealing after fully deployed. Such folds or pleats may provide sufficient redundancy within the space occupied by the skirt to fill in the defect in which the skirt is deployed (e.g., about 33% of the diameter of the defect), including cases where the defect is not uniform in shape around the central waist of the occluder. Moreover, the pleats may ensure the overall profile of the occluder including the skirt is not so large that deployment of the occluder requires a delivery catheter with a large diameter, which may restrict use of the occluder.

In some embodiments, the skirt extends over the edge of a disc or lobe adjacent to the central waist, to create a cushion barrier between the stiffer nitinol braid and the heart

TABLE 1

| Device | Unmet Need | Solution |
| --- | --- | --- |
| ASD Occluder | Erosion, residual leak, heart block, micro-perforations | Use of a smaller diameter waist which does not fill the defect allows the device to become non-self-centering, so the device is pushed away from the aorta and other cardiac structures rather than remain fixed in position. The skirt provides the needed sealing in the presence of a smaller diameter central waist. |
| Post-Infarct VSD Occluder | Residual Leak | Use of a smaller diameter waist reduces the pressure on the necrotic VSD borders and the skirt allows for better sealing in the presence of a non-circular defect. |
| Membranous VSD Occluder | Heart Block | Use of a smaller diameter central waist reduces the pressure on the electrical conduction system of the heart and the skirt allows for adequate sealing when utilizing a smaller central waist. |
| LAA Occluder | Residual Leak; Micro-Perforation | Use of a smaller diameter lobe reduces the pressure on the LAA wall and the skirt allows for better sealing in the presence of a non-circular defect. |

In some embodiments, the skirt is attached circumferentially to the external surface of the central waist with sutures or other means (such as thermal bonding). The sutures are placed on the proximal portion of the central waist, and the skirt is draped over the remainder portion of the central wall, to further protect against erosion of the heart wall due to rubbing of the nitinol wires. In some such embodiments, the skirt may be coupled to the occluder along the edge of the disc or lobe, or at another location on the disc or lobe. In some such embodiments, the skirt is attached to the occluder at the central waist (e.g., circumferentially about the central waist) and along the edge of the disc or lobe (e.g., circumferentially around the edge of the disc or lobe). The skirt may be coupled along the edge of the disc or lobe at a terminal end of the skirt, or the skirt may extend further (e.g., proximally) past the disc or lobe such that the terminal end of the skirt is a free end that is unattached to the occluder.

Figure 14A:
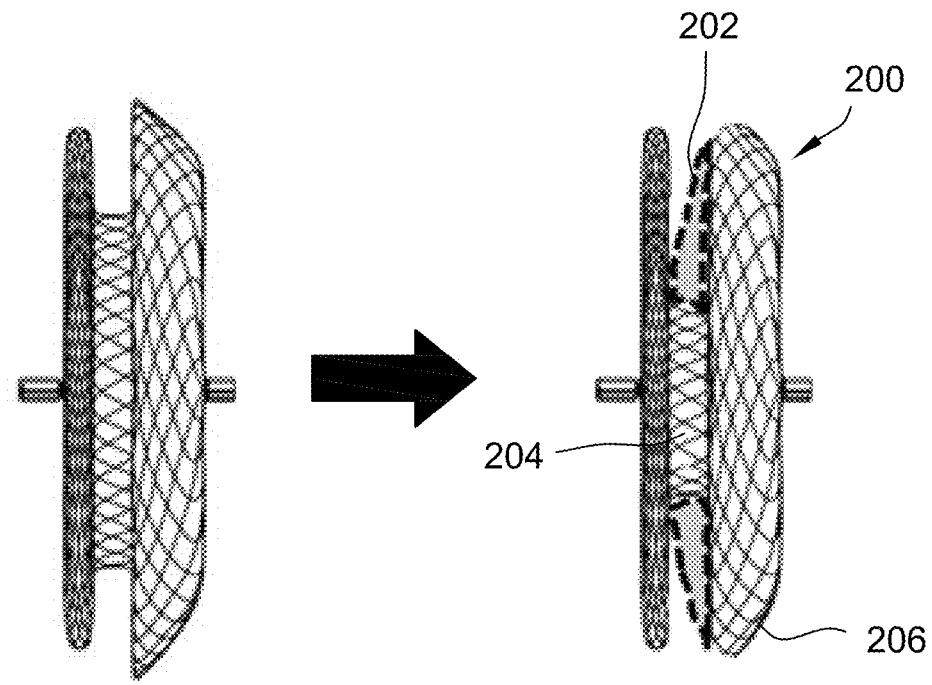
FIG. 14A is an exemplary embodiment of an occluder including a skirt in accordance with the present disclosure.
Figure 14B:
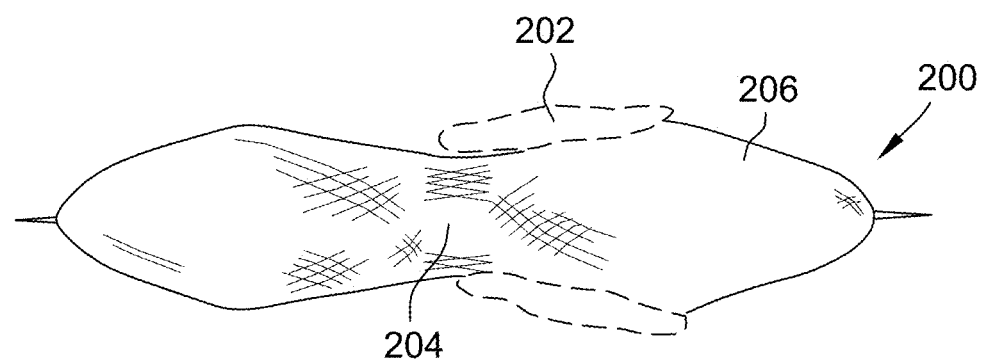
FIG. 14B is a profile view of an exemplary embodiment of an occluder including a skirt in accordance with the present disclosure.

FIG. 14A depicts an occluding device 200 in accordance with the present disclosure, the device 200 including a skirt 202 as described herein. As explained above, the device 200 including the skirt 202 has a relatively smaller central waist 204 (compared to a device without the skirt). FIG. 14B is a profile view of the device 200 with the skirt 202 depicted in stretched form (e.g., for delivery to a target site). In FIGS. 14A and 14B, the skirt 202 is coupled to a distal disc (or lobe) 206 and/or to the central waist 204.

Figure 15C:
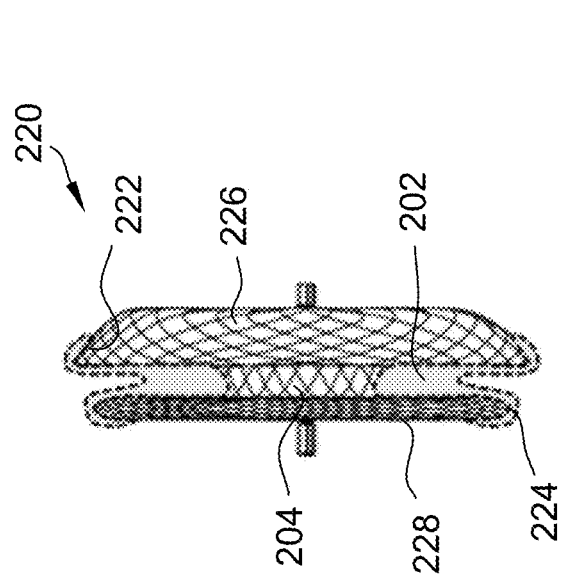
FIG. 15C is an exemplary embodiment of an occluder including a skirt covering the edge of multiple discs in accordance with the present disclosure.
Figure 15D:
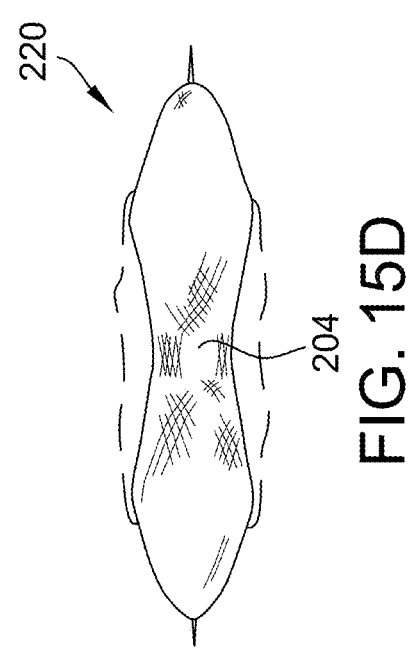
FIG. 15D is a profile view of FIG. 15C.
Figure 15A:
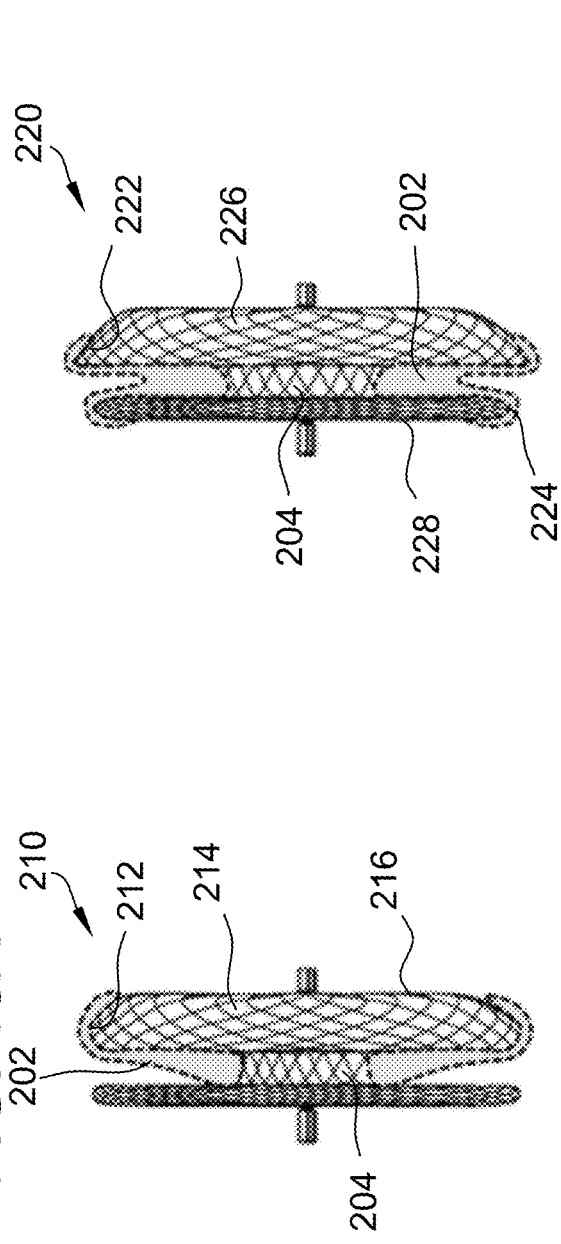
FIG. 15A is an exemplary embodiment of an occluder including a skirt covering the edge of a disc in accordance with the present disclosure.
Figure 15B:
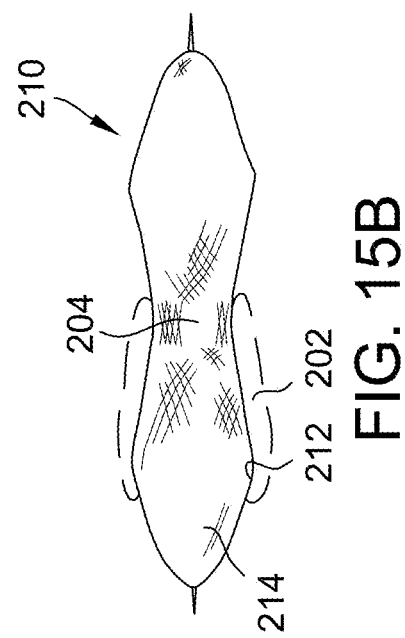
FIG. 15B is a profile view of FIG. 15A.

FIG. 15A depicts another embodiment of an occluding device 210 including a skirt 202 covering an edge 212 of a disc 214 (e.g., a left disc). FIG. 15B is a profile view of the device 210 including the skirt 202 in stretched form (e.g., for delivery to a target site). In this embodiment, the skirt 202 is coupled to the disc 214 along the edge 212 of the disc 214 and/or along an end surface 216 of the disc 214. The skirt 202 may also be coupled to the central waist 204.

FIG. 15C depicts another embodiment of an occluding device 220, in which the skirt 202 covers a respective edge 222, 224 of both discs 226, 228. FIG. 15D is a profile view of the device 220 including the skirt 202 in stretched form (e.g., for delivery to a target site). In this embodiment, the skirt 202 is coupled to the disc 226 along the edge 222 thereof and/or is coupled to the disc 228 along the edge 224 thereof.

It is noted that while these embodiments can be applied to various occluder technologies and structures to provide improved sealing and reduced heart block occurrence, these embodiments are not limited to any one occluder technology. Moreover, it should be noted that where reference is made to a "disc," the disclosure is equally applicable to a "lobe" (e.g., of an LAA occluder).

Figure 16:
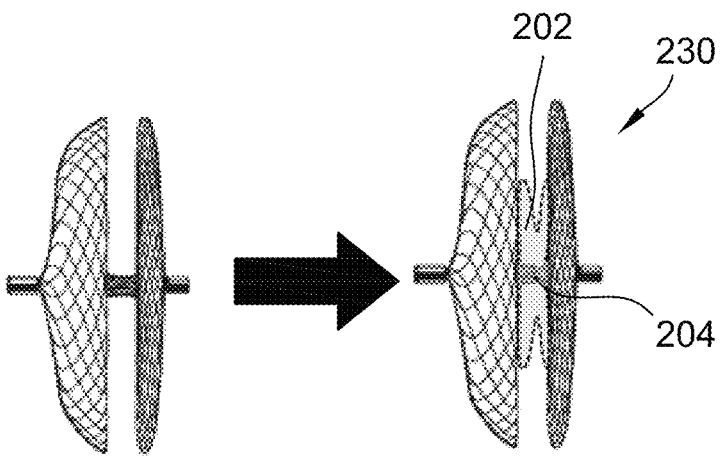
FIG. 16 is an exemplary embodiment of an occluding device in accordance with the present disclosure.

Patent Foramen Ovale (PFO): In some embodiments, as shown in FIG. 16, a sealing skirt 202 is added to a double disc PFO device 230 to prevent a residual leak after implantation of the device 230. In a certain percentage of PFO cases, there is still a residual leak after implantation due to device placement and/or the anatomical variations of the PFO within the septum. By placing the sealing skirt 202 around the central waist 204 of the PFO device 230, the skirt 202 adapts to the anatomy of the PFO and prevents a residual leak through the PFO tunnel.

Figure 17:
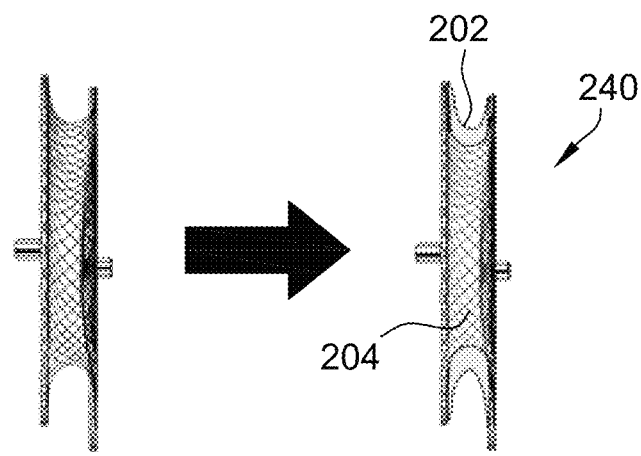
FIG. 17 is an exemplary embodiment of an occluding device in accordance with the present disclosure.

Membranous VSD: One of the biggest challenges with a membranous VSD closure is that the outward force from the device on the interventricular septal wall causes electrical disturbances in the heart resulting in heart block. In some embodiments, as shown in FIG. 17, by adding a sealing skirt 202 to the central waist 204 of a membranous VSD device 240, the central waist 204 exhibits less outward force, as the sealing skirt 202 provides the necessary sealing between the device 240 and the interventricular septal wall. Often with membranous VSD devices, there is difficulty in sealing because the superior rim of the defect is often up against the base of the aortic valve. Besides reducing the occurrence of heart block, this sealing skirt 202 also assists in sealing off superior defects that are challenging to close with occluding devices 240.

Figure 18:
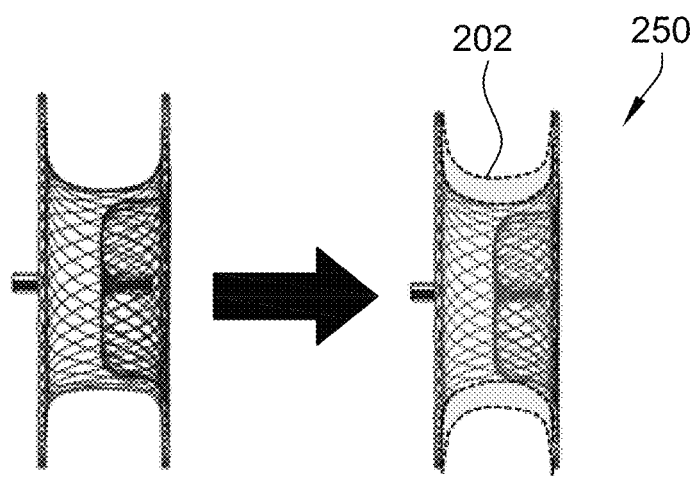
FIG. 18 is an exemplary embodiment of an occluding device in accordance with the present disclosure.

Muscular and Post Infarct Muscular VSD: Due to the anatomy of a muscular VSD, especially post-infarct VSDs, there are often challenges with sealing the VSD completely. In some embodiments, as shown in FIG. 18, by applying a sealing skirt 202 to muscular & Post Infarct muscular VSD devices 250, the versatility of these devices 250 is increased and residual leaks around the device 250 can be reduced.

Methods of Using the Device

FIGS. 19A-19F depict deployment of an occluding device 300 including a skirt 302 at a target site, such as, for example, a post-infarct ventricular septal defect (VSD). The occluding device 300 may include or may be substantially similar to any occluding device described elsewhere herein (such as, for example, medical device 200, 220, 230, 240, and/or 250).

Figure 19C:
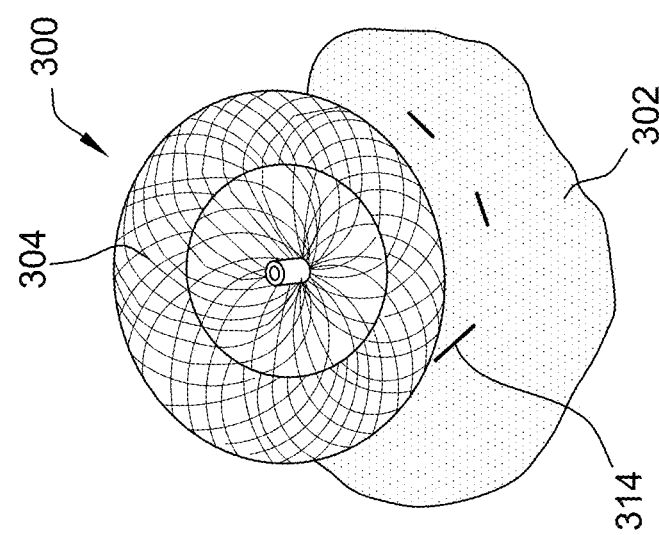
FIGS. 19A-19F depict deployment of an occluding device including a skirt in accordance with the present disclosure.
Figure 19B:
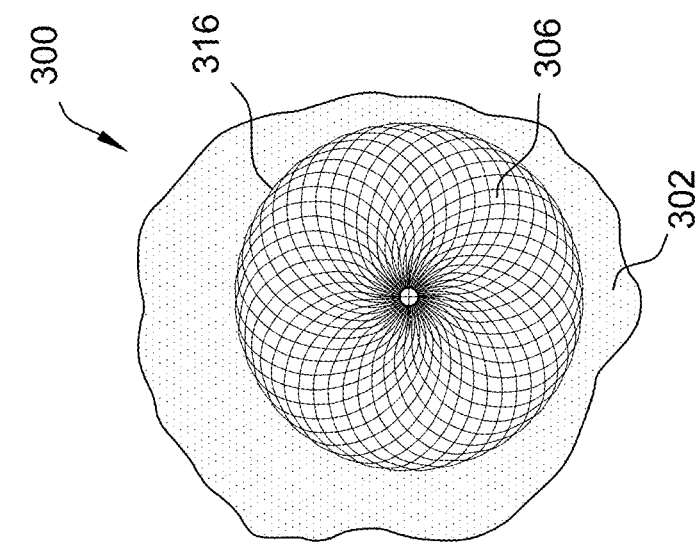
Figure 19A:
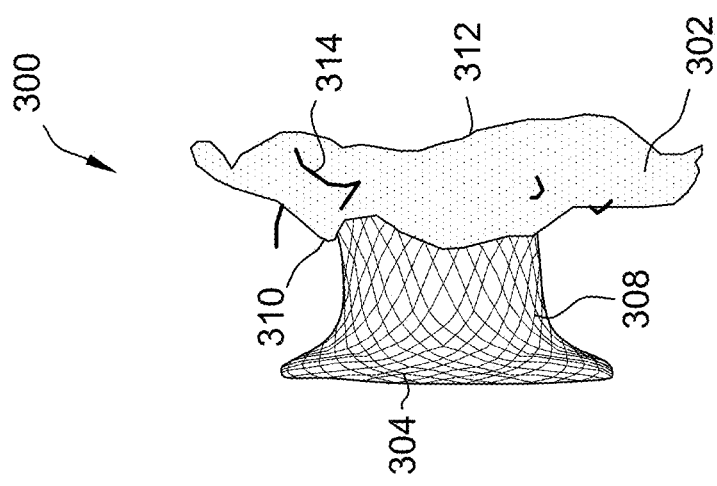

With reference first to FIGS. 19A-19C, in the exemplary embodiment, the occluding device 300 includes a proximal (right) disc 304, a distal (left) disc 306, and a central waist portion 308 extending between and connecting the proximal and distal discs 304, 306. The occluding device 300 is formed from a braided shape-memory material and, in the exemplary embodiment, is a unitary device (e.g., the discs 304, 306 and the central portion 308 are integrally formed from a single sheet or tube of material).

The skirt 302 is formed from a fabric material, as described herein, and extends from a central opening 310 to an outer edge 312. The central opening 310 has a diameter approximately equal to an outer diameter of the central waist portion 308, such that the skirt 302 engages with the central waist portion 308 at the central opening 310. The skirt 302 may be coupled to the central waist portion 308 and/or to the distal disc 306 by a plurality of sutures 314. More specifically, in the exemplary embodiment, the skirt 302 is coupled to the distal disc 306 adjacent to an outer edge 316 of the distal disc 306 using the plurality of sutures 314. Thereby, the skirt 302 forms a patch configured to engage a left-ventricular surface of the VSD, as described further herein, when the occluding device 300 is deployed. In other embodiments, the skirt 302 may be coupled to any portion of the occluding device 300 using any suitable means.

A diameter of the skirt 302, measured at the outer edge 312 thereof, is substantially larger than a diameter of the central waist portion 308, as described herein. Moreover, in the exemplary embodiment, the diameter of the skirt 302 is also substantially larger than an outer diameter of the distal disc 306. Thereby, when the occluding device 300 is deployed, the skirt 302 covers substantially an entirety of an interface between the distal disc 306 and a left-ventricular surface of the VSD and extends beyond the outer edge 316 of the distal disc 306 to enhance the sealing properties of the occluding device 300.

Figure 19F:
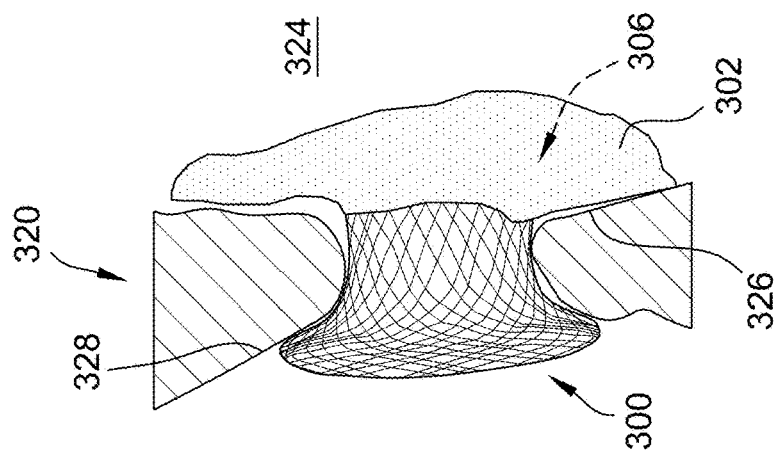
Figure 19E:
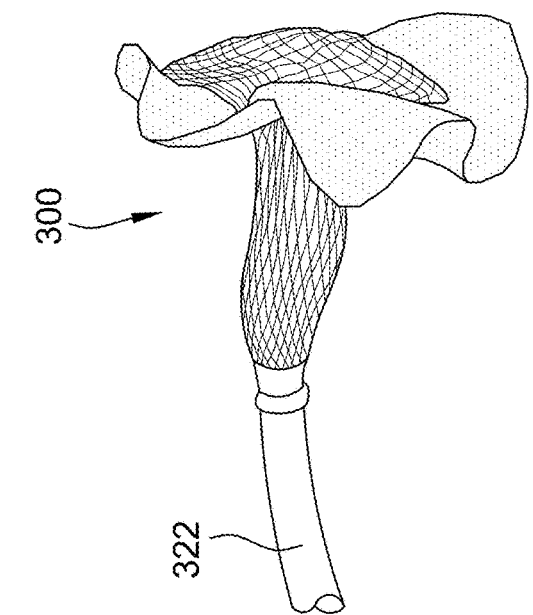
Figure 19D:
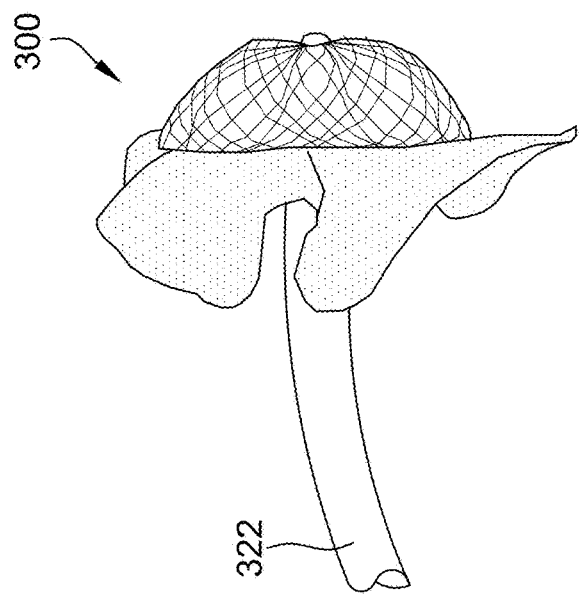

Turning to FIGS. 19D-19F, the occluding device 300 is deployed to treat a VSD 320 using a delivery sheath 322 (e.g., an 8 cm, 12-French delivery sheath). In particular, a hybrid periventricular technique is applied to deploy the occluding device 300. Initially, the occluding device 300 is retained in a collapsed configuration within the delivery sheath 322 while the delivery sheath 322 is navigated (e.g., by a physician or operator) to the target site, namely, the VSD 320. Thereafter, the occluding device 300 is deployed from the delivery sheath 322 (e.g., using a delivery cable, such as delivery cable 18, shown in FIG. 1). The distal disc 306 is first extended from the delivery sheath on a left-ventricular side 324 of the VSD 320 (see FIG. 19F). The skirt 302, coupled to the distal disc 306 as described above, is simultaneously evacuated from the delivery sheath 322. The skirt 302 expands beyond the outer edge 316 of the distal disc 306 on the left-ventricular side 324 of the VSD 320. The delivery sheath 322 and partially-deployed occluding device 300 are then retracted back such that the distal disc 306, and the skirt 302, are engaged with a left-ventricular surface 326 of the VSD 320. Thereafter, the rest of the occluding device 300 is fully deployed. The central waist portion 308 extends through the VSD 320, and the proximal disc 304 engages with a right-ventricular side 328 of the VSD 320. When the occluding device 300 is fully deployed, the skirt 302 enhances the sealing properties thereof by serving as a large patch and filling in areas that may not be fully sealed by the distal disc 306 and central waist portion 308 alone.

In accordance with the present disclosure, the medical devices disclosed herein are directed toward methods of eliminating or reducing erosion of cardiac tissue. The methods comprise providing a medical device comprising a tubular member comprising a proximal disc portion at a proximal end, a distal disc portion at a distal end, and a waist member extending between the proximal disc portion and the distal disc portion; wherein the tubular member comprises at least one braided layer and has an expanded configuration when deployed at the target site and a reduced configuration for delivery to the target site; constraining the medical device from a preset expanded configuration to a reduced configuration; delivering the medical device; deploying the medical device such that the tubular member returns to the preset expanded configuration; and, eliminating or reducing friction of the medical device on cardiac tissue.

In at least some embodiments, the medical devices disclosure herein are directed towards reducing or eliminating residual leak, heart block, and/or micro-perforations. The methods include providing a medical device including a tubular member comprising a proximal disc portion at a proximal end and a distal disc portion at a distal end and a waist member extending between the proximal disc portion and the distal disc portion; wherein the tubular member has an expanded configuration when deployed at the target site and a reduced configuration for delivery to the target site, the medical device further including a skirt coupled to an external surface of at least one of the waist member, the proximal disc portion, or the distal disc portion; constraining the medical device from a preset expanded configuration to a reduced configuration; delivering the medical device; and deploying the medical device such that the tubular member returns to the preset expanded configuration and the skirt engages the cardiac tissue surrounding the waist member.

The methods may additionally or alternatively include providing a medical device including a tubular member comprising a disc portion at a first end, a lobe at a second end, and a waist member extending between the disc portion and the lobe, wherein the tubular member comprises at least one braided layer and has an expanded configuration when deployed at the target site and a reduced configuration for delivery to the target site, the medical device further including a skirt coupled to an external surface of at least one of the waist member, the disc portion, or the lobe; constraining the medical device from a preset expanded configuration to a reduced configuration; delivering the medical device; and deploying the medical device such that the tubular member returns to the preset expanded configuration and the skirt engages the cardiac tissue surrounding the waist member.

It is understood that each and every embodiment disclosed herein throughout this disclosure is configured to be used according to these methods.

Although certain embodiments of this disclosure have been described above with a certain degree of particularity, those skilled in the art could make numerous alterations to the disclosed embodiments without departing from the spirit or scope of this disclosure. All directional references (e.g., upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of the disclosure. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the disclosure as defined in the appended claims.

When introducing elements of the present disclosure or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions without departing from the scope of the disclosure, it is intended that all matter contained in the above description or shown in the accompanying drawings shall be interpreted as illustrative and not in a limiting sense.

What is claimed is:

1. A medical device for treating a target site, the medical device comprising:
   a tubular member comprising a proximal disc portion at a proximal end, a distal disc portion at a distal end, and a waist member extending between the proximal disc portion and the distal disc portion, wherein the tubular member comprises at least one braided layer of a first material and has an expanded configuration when deployed at the target site and a reduced configuration for delivery to the target site; and
   a skirt coupled to an external surface of the tubular member, the skirt comprising at least one layer of a second material softer than the first material, the skirt being attached circumferentially at one end thereof to an external surface of the distal disc portion and loosely draped over the waist member and attached at an opposing end thereof to an external surface of the waist member,
   wherein, when the medical device is deployed and the tubular member is in the expanded configuration, the skirt is configured to expand beyond a circumferential profile of the tubular member and radially away from the waist member into a space defined circumferentially around the waist member; and wherein the medical device is an occluding device.

2. The medical device of claim 1, wherein the skirt is coupled to the external surface of the distal disc portion by one or more sutures.

3. The medical device of claim 1, wherein the skirt is coupled to the external surface of the distal disc portion by thermal bonding.

4. The medical device of claim 1, wherein the skirt is formed from one of a synthetic material, preserved tissue, or a fine nitinol braid.

5. The medical device of claim 1, wherein a diameter of the skirt is significantly larger than a diameter of the waist member.

6. The medical device of claim 1, wherein a diameter of the skirt is significantly larger than a diameter of the waist member and at least one of the proximal disc portion or the distal disc portion.

7. The medical device of claim 1, wherein the skirt has a diameter such that the skirt fills a space between the external surface of the waist member and a surface of adjacent tissue, when the medical device is deployed at the target site.

8. The medical device of claim 1, wherein the skirt has a diameter such that the skirt extends beyond a circumference of at least one of the proximal disc portion or the distal disc portion and seals against adjacent tissue, when the medical device is deployed at the target site.

9. The medical device of claim 1, wherein the skirt includes a plurality of pleats.

10. A method comprising:
   providing a medical device according to claim 1;
   constraining the medical device from a preset expanded configuration to a reduced configuration;
   delivering the medical device; and
   deploying the medical device such that the tubular member returns to the preset expanded configuration and the skirt engages a cardiac tissue surrounding one or more of the waist member, the proximal disc portion, or the distal disc portion.

11. The method of claim 10, wherein providing the medical device comprises:
   determining a diameter of a structure of the cardiac tissue being occluded; and
   selecting the medical device with a diameter of the waist member smaller than the diameter of the structure.

12. The method of claim 11, further comprising coupling the skirt to the waist member, wherein a diameter of the skirt is significantly larger than the diameter of the waist member.

13. The method of claim 10, further comprising coupling the skirt to the distal disc portion, wherein a diameter of the skirt is significantly larger than the diameter of at least one of the waist member, the proximal disc portion, or the distal disc portion.

14. The method of claim 10, further comprising coupling the skirt to the distal disc portion using a plurality of sutures.

15. A medical device for treating a target site, the medical device comprising:
   a tubular member comprising a disc portion at a first end, a lobe at a second end, and a waist member extending between the disc portion and the lobe, wherein the tubular member comprises at least one braided layer of a first material and has an expanded configuration when deployed at the target site and a reduced configuration for delivery to the target site; and
   a skirt coupled to an external surface of the tubular member, the skirt being attached circumferentially at one end thereof to an external surface of the lobe and loosely draped over the waist member and attached at an opposing end thereof to an external surface of the waist member, the skirt comprising at least one layer of a second material softer than the first material,
   wherein, when the medical device is deployed and the tubular member is in the expanded configuration, the skirt is configured to expand beyond a circumferential profile of the tubular member and radially away from the waist member into a space defined circumferentially around the waist member; and wherein the medical device is an occluding device.

16. The medical device of claim 15, wherein the skirt is coupled to the external surface of the lobe by one or more sutures.

17. The medical device of claim 15, wherein a diameter of the skirt is significantly larger than a diameter of the waist member and at least one of the disc portion or the lobe.

18. The medical device of claim 15, wherein the skirt includes a plurality of pleats.

* * * * *